(12) United States Patent
Wang et al.

(10) Patent No.: US 11,303,367 B2
(45) Date of Patent: Apr. 12, 2022

(54) METHOD FOR INTERFERENCE MEASUREMENT IN NEW RADIO (NR) COMMUNICATION SYSTEMS

(71) Applicant: Apple Inc., Cupertino, CA (US)

(72) Inventors: Guotong Wang, Beijing (CN); Yushu Zhang, Beijing (CN); Qian Li, Beaverton, OR (US); Alexei Davydov, Nizhny Novgorod (RU); Seok Chul Kwon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 16/488,039

(22) PCT Filed: Mar. 22, 2018

(86) PCT No.: PCT/US2018/023684
§ 371 (c)(1),
(2) Date: Aug. 22, 2019

(87) PCT Pub. No.: WO2018/175674
PCT Pub. Date: Sep. 27, 2018

(65) Prior Publication Data
US 2020/0067614 A1 Feb. 27, 2020

Related U.S. Application Data

(60) Provisional application No. 62/482,868, filed on Apr. 7, 2017.

(30) Foreign Application Priority Data

Mar. 24, 2017 (WO) ................ PCT/CN2017/078089

(51) Int. Cl.
*H04W 72/08* (2009.01)
*H04B 17/345* (2015.01)
(Continued)

(52) U.S. Cl.
CPC ........ *H04B 17/345* (2015.01); *H04J 11/0056* (2013.01); *H04L 5/0057* (2013.01)

(58) Field of Classification Search
CPC ... H04B 17/345; H04B 7/043; H04J 11/0023; H04J 11/0056; H04L 5/0057
See application file for complete search history.

(56) References Cited

U.S. PATENT DOCUMENTS 8,760,992 B2 * 6/2014 Xing ................... H04W 72/085
370/203
10,454,554 B2 * 10/2019 Kwak ................. H04B 7/0452
(Continued)

FOREIGN PATENT DOCUMENTS

WO 2014/166061 A1 10/2014
WO 2015/006940 A1 1/2015

OTHER PUBLICATIONS

International Search Report dated Aug. 22, 2018 for International Application No. PCT/US2018/023684.
(Continued)

*Primary Examiner* — Phuc H Tran
(74) *Attorney, Agent, or Firm* — Eschweiler & Potashnik, LLC

(57) ABSTRACT

An apparatus configured to be employed in a victim transmission reception point (TRP) associated with a new radio (NR) communication system is disclosed. The apparatus comprises a memory interface and a processing circuit. In some embodiments, the processing circuit is configured to process one or more predefined interference signals respectively received from one or more interfering TRPs during a guard period of the victim TRP. In some embodiments, the guard period comprises a time period between a downlink (DL) transmission and an uplink (UL) transmission associated with a time division duplex (TDD) frame of the victim TRP. In some embodiments, the processing circuit is further
(Continued)

configured to determine an inter-TRP interference based on the one or more predefined interference signals. In some embodiments, the inter-TRP interference comprises a measurement of a UL interference at the victim TRP from the one or more interfering TRPs.

23 Claims, 15 Drawing Sheets

(51) Int. Cl.
　　　*H04J 11/00*　　　　(2006.01)
　　　*H04L 5/00*　　　　(2006.01)

(56) References Cited

U.S. PATENT DOCUMENTS

| | | | | |
|---|---|---|---|---|
| 2013/0301434 | A1* | 11/2013 | Krishnamurthy | H04B 7/0617 370/252 |
| 2015/0181453 | A1* | 6/2015 | Chen | H04L 1/0027 370/252 |
| 2015/0358139 | A1* | 12/2015 | Li | H04L 5/0057 370/252 |
| 2016/0006553 | A1* | 1/2016 | Kim | H04L 1/1861 370/252 |
| 2016/0135143 | A1* | 5/2016 | Won | H04W 12/08 370/312 |
| 2016/0344487 | A1* | 11/2016 | Lee | H04B 7/0632 |
| 2017/0034727 | A1* | 2/2017 | Li | H04W 24/08 |
| 2017/0180100 | A1* | 6/2017 | Lee | H04W 72/0413 |
| 2021/0136823 | A1* | 5/2021 | Kim | H04W 74/08 |

OTHER PUBLICATIONS

"SDIM for TDD eIMTA." Source: Huawei, HiSiiicon. Agenda Item: 7.2.3.1. 3GPP TSG RAN WG1 meeting #72bis, Chicago, USA, Apr. 15-19, 2013. R1-131160.
"About CSI-RS MIMO Info Table (LTE-Advanced)." 2000-2019 Keysight Technologies, Inc. http://rfmw.em.keysight.com/wireless/helpfiles/89600B/WebHelp/Subsystems/lte-a/content/trc_mimo_csi-rs_info_table.htm.
Rayal, Frank. "An overview of the LTE physical layer—Part 1." EE/Times. https://www.eetimes.com/document.asp?doc_id=1278096.
Zirwas, Wolfgang et al. "Coded CSI Reference Signals for 5G—Exploiting Sparsity of FDD Massive MIMO Radio Channels." WSA 2016. Mar. 9-11, 2016, Munich, Germany.
Zaidi, Ali et al. "Designing for the future: the 5G NR physical layer." Ericsson Technology Review. Jul. 24, 2017. https://www.ericsson.com/en/ericsson-technology-review/archive/2017/designing-for-the-future-the-5g-nr-physical-layer.
Vikram K. "Learning LTE." Learning LTE: Reference Signals. Apr. 12, 2012. http://lte-epc.blogspot.com/2012/04/reference-signals.html.
"Frame Structure—Downlink." ShareTechnote. http://sharetechnote.com/html/FrameStructure_DL.html.
What is an antenna port and their mapping? To become a LTE Expert? http://lteexpert.blogspot.com/2014/10/what-is-antenna-port-and-there-mapping.html.
Pauli, Volker et al. "Dynamic TDD for LTE-A and 5G." Nomor Research GmbH, Munich, Germany. Sep. 2015.
La Rocca, Maurizio. "RSRP and RSRQ Measurement in LTE." RSRP and RSRQ Measurement in LTE—Iaroccasolutions. Apr. 4, 2016.
International Preliminary Report on Patentability dated Sep. 24, 2019 for International Application No. PCT/US2018/023684.
Intel Corporation; "On Interference Measurement for CSI"; 3GPP TSG-RAN WG1 #88; R1-1702207; Feb. 17, 2017.
3rd Generation Partnership Project; Technical Specification Group Radio Access Network; NR; Physical layer procedures for data (Release 15); 3GPP TS 38.214 V0.0.3; Aug. 2017.
3rd Generation Partnership Project; Technical Specification Group Radio Access Network; NR; Physical layer procedures for data (Release 15); 3GPP TS 38.214 V15.2.0; Jun. 2018.
3rd Generation Partnership Project; Technical Specification Group Radio Access Network; NR; Radio Resource Control (RRC); Protocol specification (Release 15 ); 3GPP TS 38.331 V0.1.0; Oct. 2017.
3rd Generation Partnership Project; Technical Specification Group Radio Access Network; NR; Radio Resource Control (RRC); Protocol specification (Release 15); 3GPP TS 38.331 V0.1.0; Oct. 2017 Document uploaded Jan. 1, 2018 to 3GPP website is labeled "3GPP TS 38.331 V0.3.0" on 3GPP website: https://portal.3gpp.org/desktopmodules/Specifications/SpecificationDetails.aspx?specificationId=3197 but actual document states "V0.1.0" when "V0.3.0" link is opened.
3rd Generation Partnership Project; Technical Specification Group Radio Access Network; NR; Radio Resource Control (RRC) protocol specification (Release 15); 3GPP TS 38.331 V15.3.0; Sep. 2018.
3rd Generation Partnership Project;Technical Specification Group Radio Access Network; NR; Physical layer procedures for data (Release 15); 3GPP TS 38.214 V0.0.1; Jul. 2017.
3rd Generation Partnership Project; Technical Specification Group Radio Access Network; NR; Radio Resource Control (RRC); Protocol specification(Release 15); 3GPP TS 38.331 V0.0.3; May 2017.
3rd Generation Partnership Project; Technical Specification Group Radio Access Network NR; Radio Resource Control (RRC); Protocol specification (Release 15); 3GPP TS 38.331 V0.0.5; Aug. 2017.
3rd Generation Partnership Project; Technical Specification Group Radio Access Network; NR; Physical layer procedures for data (Release 15); 3GPP TS 38.214 V15.0.0; Dec. 2017.
3rd Generation Partnership Project; Technical Specification Group Radio Access Network; NR; Physical layer procedures for data (Release 15); 3GPP TS 38.214 V15.1.0; Mar. 2018.
3rd Generation Partnership Project; Technical Specification Group Radio Access Network; NR; Radio Resource Control (RRC); Protocol specification (Release 15); 3GPP TS 38.331 V0.0.1; Mar. 2017.
3rd Generation Partnership Project; Technical Specification Group Radio Access Network; NR; Radio Resource Control (RRC); Protocol specification (Release 15); 3GPP TS 38.331 V0.0.2; Mar. 2017.
3rd Generation Partnership Project; Technical Specification Group Radio Access Network NR; Radio Resource Control (RRC) protocol specification (Release 15); 3GPP TS 38.331 V15.0.0; Dec. 2017.
3rd Generation Partnership Project; Technical Specification Group Radio Access Network; NR; Radio Resource Control (RRC) protocol specification (Release 15); 3GPP TS 38.331 V15.1.0; Mar. 2018.

* cited by examiner

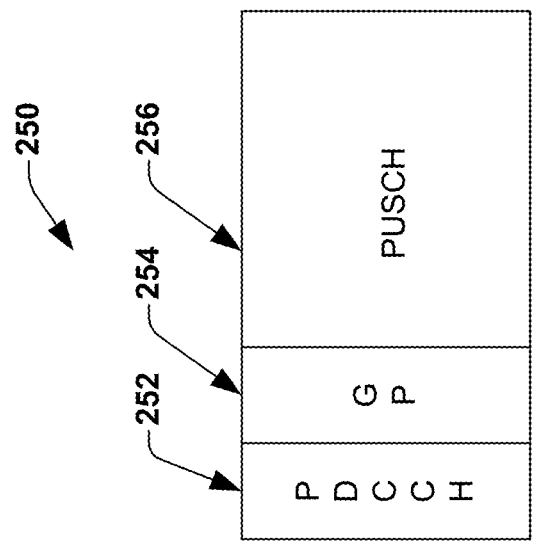
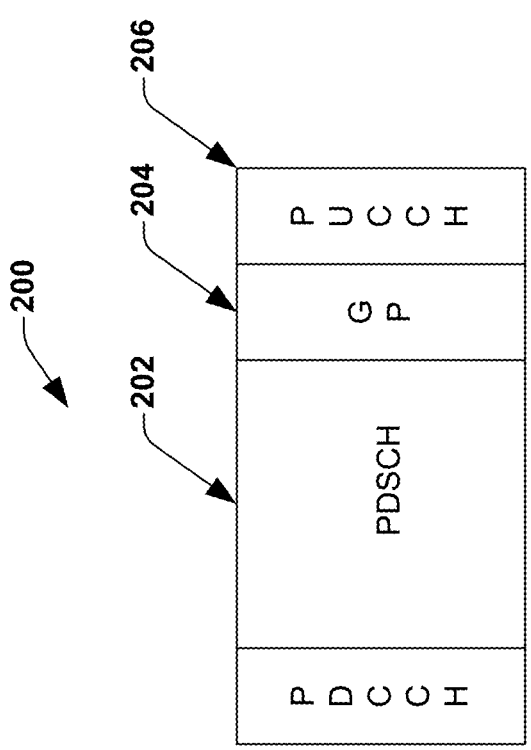
FIG. 2b
FIG. 2a

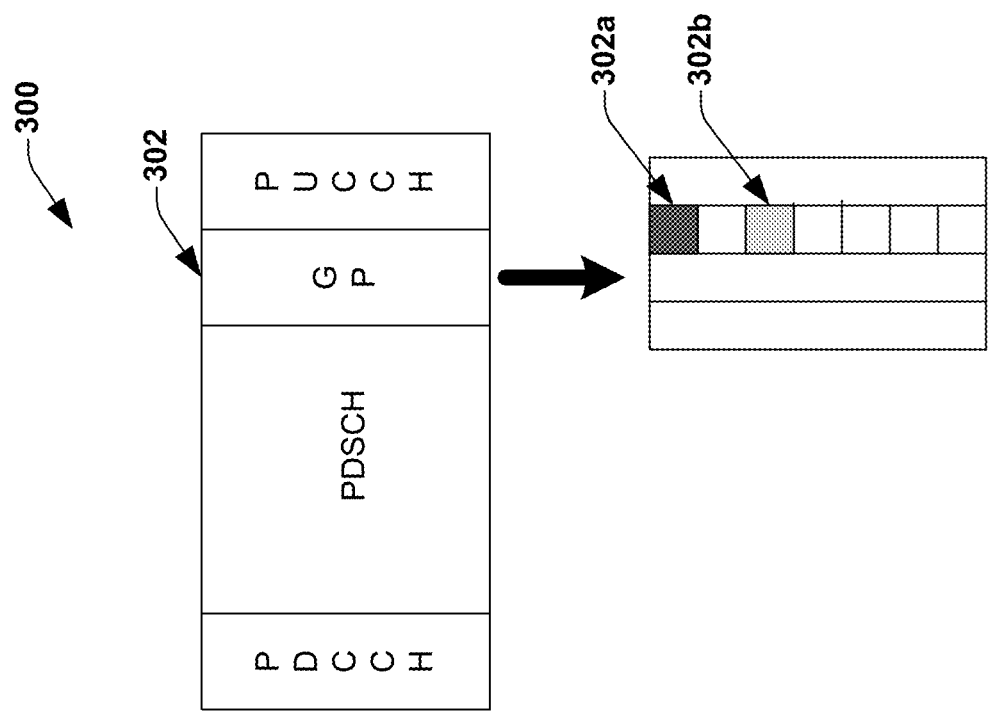

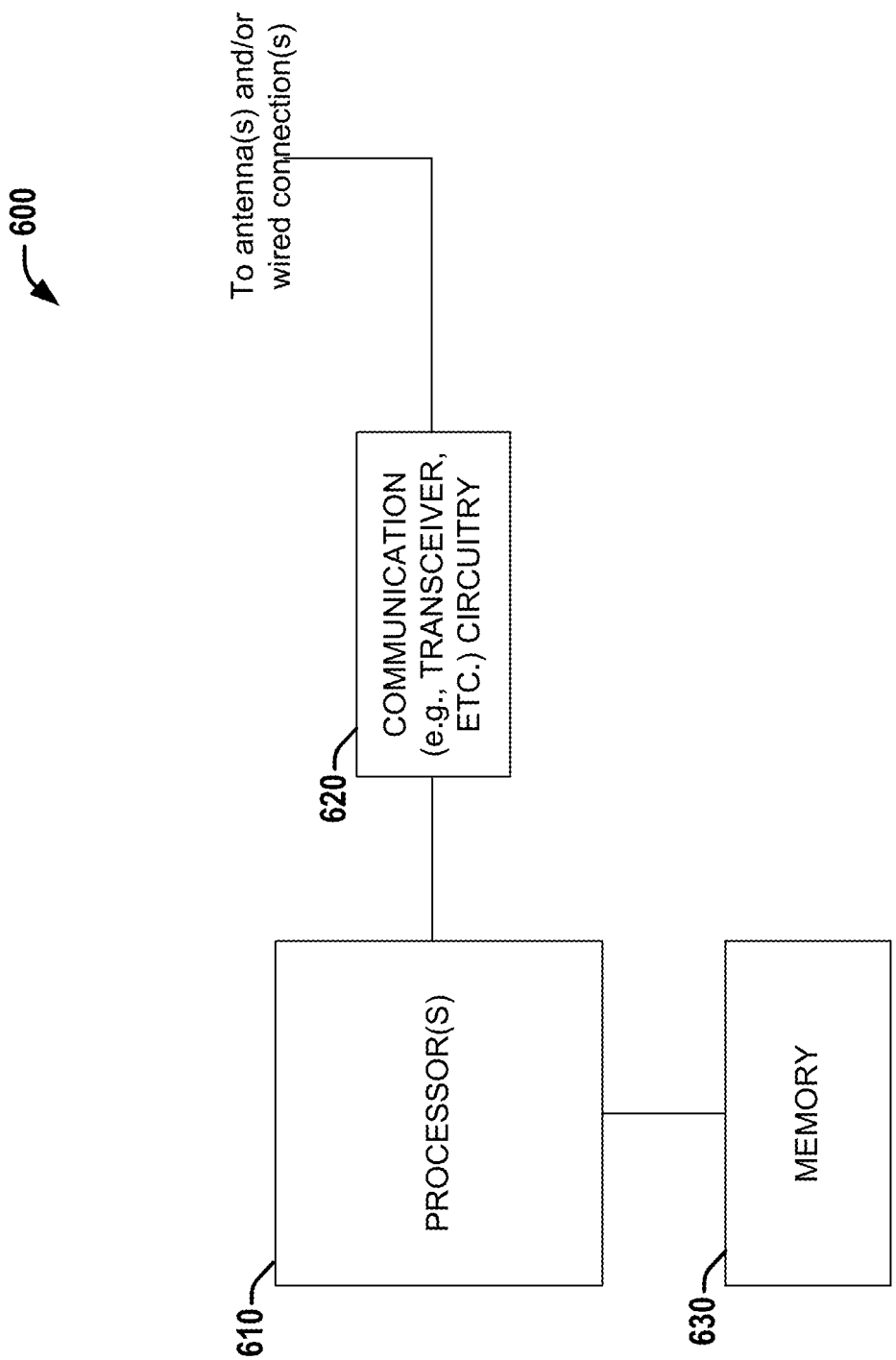

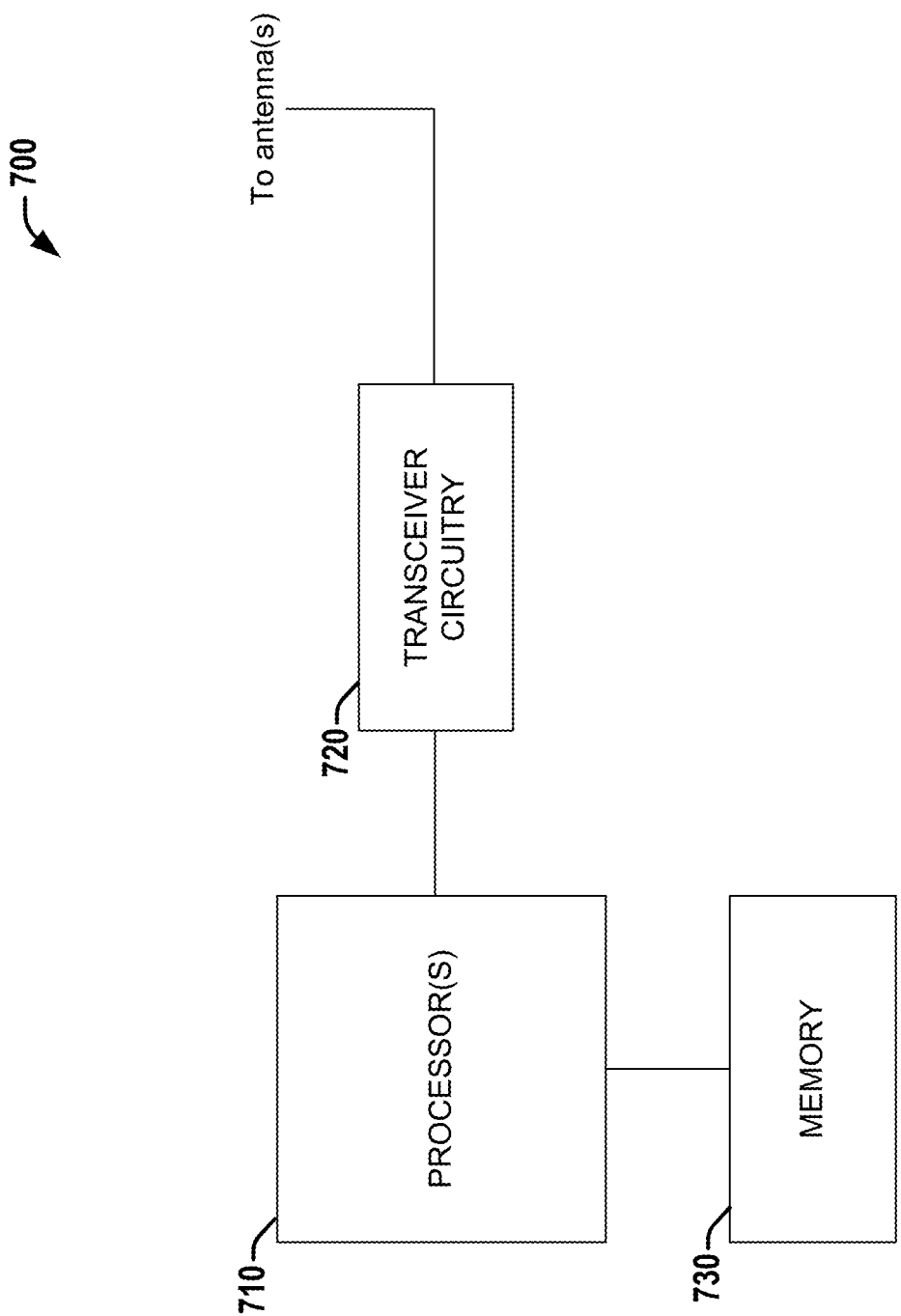

Example UE

US 11,303,367 B2

METHOD FOR INTERFERENCE MEASUREMENT IN NEW RADIO (NR) COMMUNICATION SYSTEMS

REFERENCE TO RELATED APPLICATIONS

This application is a National Phase entry application of International Patent Application No. PCT/US2018/023684 filed Mar. 22, 2018, which claims priority to Application No. PCT/CN2017/078089, filed Mar. 24, 2017, entitled "INTER-TRANSMISSION RECEPTION POINT (TRP) INTERFERENCE MEASUREMENT IN NEW RADIO (NR) UPLINK (UL)" and provisional Application No. 62/482,868, filed Apr. 7, 2017, entitled "CHANNEL STATE INFORMATION (CSI) MEASUREMENT WITH CSI-REFERENCE SIGNAL (RS) AND DEMODULATION REFERENCE SIGNAL (DM-RS) IN NEW RADIO (NR)", and is hereby incorporated by reference in its entirety.

FIELD

The present disclosure relates to the field of new radio (NR) communication systems, and in particular, to a method for measuring interference in NR communication systems.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. Interference measurement is important to obtain the interference characteristic to assist in link adaptation and scheduling in 5G NR system. In the 5G NR system, beam forming may be used at both the Transmission Reception Point (TRP) side and the user equipment (UE) side. The UE and the TRP may maintain the best several TRP beams and UE beams for communication and measurement. The pair of TRP transmission beam and UE reception beam changes dynamically due to the channel variation. Therefore, in such embodiments, link adaptation is necessary. In order to do link adaptation, it is important to estimate the interference so that the channel quality information (CQI) can be calculated accurately.

BRIEF DESCRIPTION OF THE DRAWINGS

Some examples of circuits, apparatuses and/or methods will be described in the following by way of example only. In this context, reference will be made to the accompanying Figures.

FIG. 2a illustrates a time division duplex (TDD) data frame associated with a new radio (NR) communication system, according to one embodiment of the disclosure.

FIG. 2b illustrates a time division duplex (TDD) data frame associated with a new radio (NR) communication system, according to another embodiment of the disclosure.

FIG. 3 illustrates an interfering signal structure associated with the guard period of a victim TRP, according to one embodiment of the disclosure.

FIG. 6 illustrates a block diagram of an apparatus employable at a Base Station (BS), eNodeB, gNodeB, a transmission reception point (TRP) or other network device, in accordance with the various aspects described herein.

FIG. 7 illustrates a block diagram of an apparatus employable at a UE or other network device (e.g., IoT device) that facilitates to determine channel state information (CSI), according to various aspects described herein.

DETAILED DESCRIPTION

Figure 1:
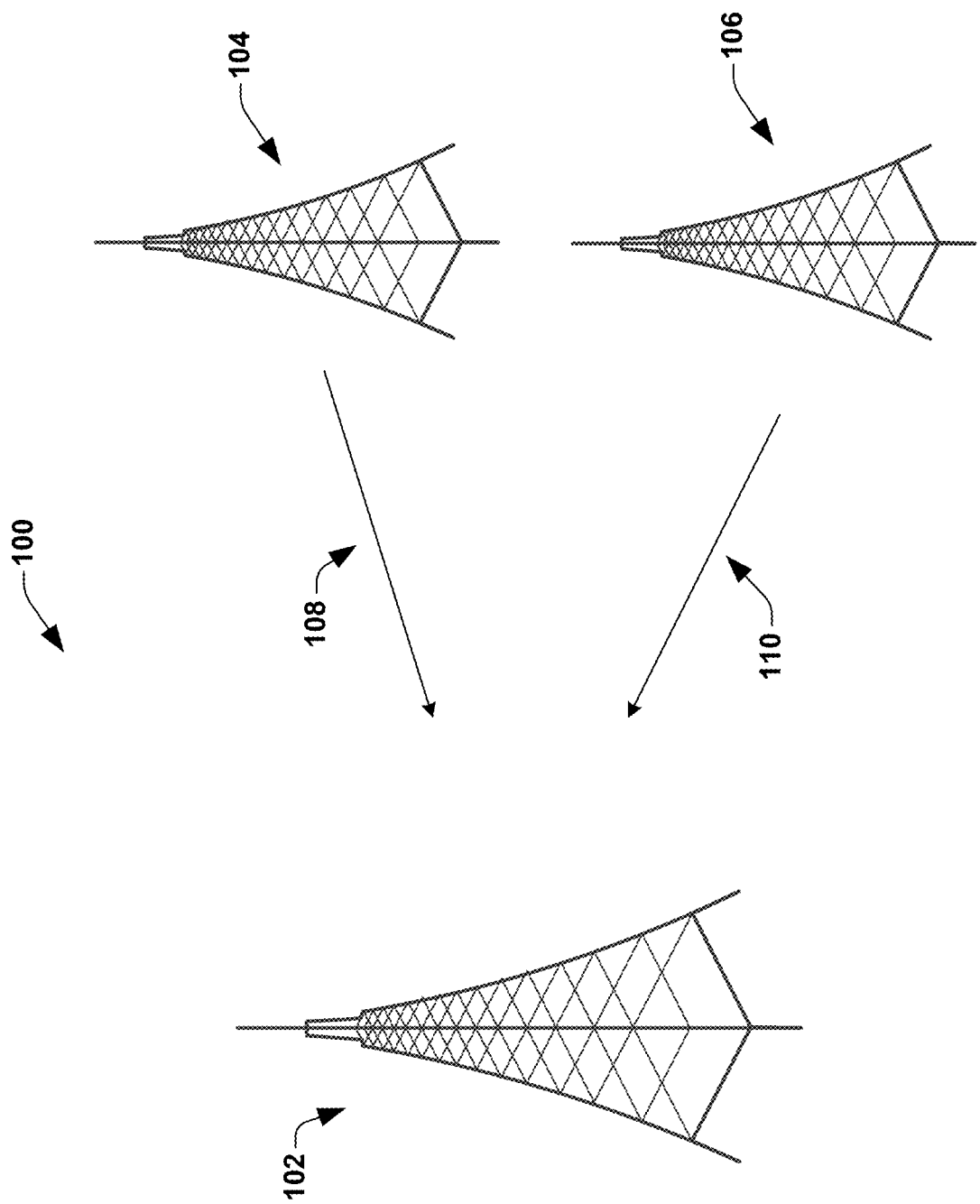
FIG. 1 illustrates a simplified block diagram of a new radio (NR) communication system, according to one embodiment of the disclosure.

In one embodiment of the disclosure, an apparatus configured to be employed in a victim transmission reception point (TRP) associated with a new radio (NR) communication system is disclosed. In some embodiments, a victim TRP comprises a memory interface configured to receive instructions from a memory; and a processing circuit. In some embodiments, the processing circuit, upon execution of the instructions received from the memory interface, is configured to process one or more predefined interference signals respectively received from one or more interfering TRPs during a guard period of the victim TRP. In some embodiments, the guard period comprises a time period between a downlink (DL) transmission and an uplink (UL) transmission associated with a time division duplex (TDD) frame of the victim TRP. In some embodiments, the processing circuit is further configured to determine an inter-TRP interference based on the one or more predefined interference signals. In some embodiments, the inter-TRP interference comprises a measurement of a UL interference at the victim TRP from the one or more interfering TRPs.

In one embodiment of the disclosure, an apparatus configured to be employed in an interfering transmission reception point (TRP) associated with a new radio (NR) communication system is disclosed. In some embodiments, the apparatus comprises a memory interface configured to receive instructions from a memory, a processing circuit and a radio-frequency (RF) interface. In some embodiments, the processing circuit, upon execution of the instructions received from the memory interface, is configured to generate a predefined interference signal, to be provided to a victim TRP during a guard period of the victim TRP, in order to enable the victim TRP to determine an inter-TRP interference. In some embodiments, the guard period comprises a time period between a downlink (DL) transmission period and an uplink (UL) transmission period associated with a time division duplex (TDD) frame of the victim TRP. In some embodiments, the processing circuit is further configured to determine an interfering signal resource within the guard period of the victim TRP, to be utilized by the processing circuit, for a transmission of the predefined interference signal. In some embodiments, the interfering signal resource comprises one or more time-frequency resources within the guard period of the victim TRP. In some embodiments, the processing circuit is further configured to generate a transmission of the predefined interference signal using the determined interfering signal resource. In some embodiments, the RF interface is configured to provide the generated transmission of the predefined interference signal, to an RF circuitry, for subsequent transmission of the predefined interference signal.

In one embodiment of the disclosure, an apparatus configured to be employed in a transmission reception point (TRP) associated with a new radio (NR) system is disclosed. The apparatus comprises a memory interface configured to receive instructions from a memory, a processing circuit and a radio frequency (RF) interface. In some embodiments, the processing circuit, upon execution of the instructions received from the memory interface, is configured to determine an interference measurement resource (IMR) configuration for a user equipment (UE). In some embodiments, the IMR configuration comprises a configuration information associated with a set of IMRs configured to be utilized for channel state information (CSI) measurement at the UE. In some embodiments, the processing circuit is further configured to generate an IMR configuration signal comprising the determined IMR configuration, to be provided to UE, in order to provide information on the determined IMR configuration to the UE. In some embodiments, the radio frequency (RF) interface is configured to provide the IMR configuration signal, to an RF circuitry, for subsequent transmission of the IMR configuration signal to the UE.

In one embodiment of the disclosure, an apparatus configured to be employed in a user equipment (UE) associated with a new radio (NR) system is disclosed. The apparatus comprises a memory interface configured to receive instructions from a memory; and a processing circuit. In some embodiments, the processing circuit, upon execution of the instructions received from the memory interface, is configured to process an interference measurement resource (IMR) configuration signal comprising an IMR configuration for the UE, received from a TRP. In some embodiments, IMR configuration comprises a configuration information associated with a set of IMRs configured to be utilized for channel state information (CSI) measurement at the UE. In some embodiments, the processing circuit is further configured to determine the channel state information (CSI), at least partly, based on the information in the IMR configuration signal.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form.

Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the next generation wireless communication system, 5G, or new radio (NR) will provide access to information and sharing of data anywhere, anytime by various users and applications. In order to do link adaptation and scheduling in NR communication systems, it is important to estimate the interference so that the channel quality information (001) can be calculated accurately. In dynamic time division duplex (TDD) system, the downlink and uplink transmission within one frame is configurable. It means that, in some embodiments, the downlink/uplink configuration could be different for neighboring TRPs in dynamic TDD system. Therefore, in some embodiments, downlink transmission from some TRPs may cause interference to other TRP's uplink reception.

In some embodiments, a TRP that is receiving the interference comprises a victim TRP and a TRP that is causing the interference comprises an interfering TRP. In particular, for a dynamic TDD system, there can be TRP-to-TRP interference or inter-TRP interference in uplink (UL), when a victim TRP is performing uplink (UL) reception and the interfering TRP is performing downlink (DL) transmission at the same time. Different TRP-to-TRP interference levels may be observed for different transmit (Tx)-receive (Rx) beam pairs. The inter-TRP or TRP-to-TRP interference could be severe especially for dense networks with smaller coverage radius. Therefore, in some embodiments, information on the inter-TRP interference in uplink (UL) is required to perform link adaptation accurately.

Further, in some embodiments, information on a downlink (DL) interference at a user equipment (UE) or channel state information (CSI) is required, in order to do link adaptation. In some embodiments, an interference measurement resource (IMR), for example, a channel state information reference signal (CSI-RS), demodulation reference signal (DM-RS) etc. are utilized to determine the DL interference or CSI at the UE. In some embodiments, since DM-RS is precoded and always sent together with data, the DM-RS could provide some realistic interference information. Further, compared with CSI-RS, the DM-RS based solution occupies less overhead. However, the DM-RS can just provide narrow band interference information compared to CSI-RS.

Therefore, in order to get accurate DL interference measurement or CSI, an apparatus and a method to determine DL interference or CSI based on configuring an IMR is proposed in this disclosure. In particular, a set of IMRs to be utilized for interference measurement at the UE is configured, prior to determining the DL interference or CSI, further details of which are provided in embodiments below. For example, in some embodiments, the set of IMRs comprises one or more reference signals, for example, CSI-RS, DM-RS etc.

In addition, an apparatus and a method to determine the inter-TRP interference is proposed in this disclosure. In particular, a method that utilizes a guard period associated with a TDD frame in order to get accurate inter-TRP interference information for uplink is proposed herein. In some embodiments, a guard period comprises a time period between a downlink transmission period and an uplink transmission period associated with a TDD frame. In some embodiments, in order to measure the inter-TRP interference, the interfering TRP is configured to send some signal in the guard period of the victim TRP and the victim TRP is configured to measure the interference based on the signal received from the interfering TRP, further details of which are explained in embodiments below.

FIG. 1 illustrates a simplified block diagram of a new radio (NR) communication system 100, according to one embodiment of the disclosure. The NR communication system 100 comprises a transmission reception point (TRP) 102, a TRP 104 and a TRP 106. However, in other embodiments, the NR communication system 100 can comprise more or less TRPs than above and may also comprise one or more user equipments (UEs). In some embodiments, a TRP is equivalent to a base station, eNodeB in LTE, gNodeB etc. and a UE may comprise a mobile phone, tablet computer etc. In some embodiments, a TRP can act as a victim TRP or an interfering TRP at different instances. In some embodiments, a victim TRP comprises a TRP that receives interference and an interfering TRP comprises a TRP that causes interference. In this embodiment, the TRP 102 comprises a victim TRP that receives interference from the neighboring TRPs 104 and 106, and the TRP 104 and the TRP 106 comprises interfering TRPs that causes interference to the victim TRP 102. Therefore, the TRP 102 is referred to as a victim TRP 102 hereinafter for the ease of reference. Similarly, the TRP 104 is referred to as a first interfering TRP 104 and the TRP 106 is referred to as a second interfering TRP 106, respectively, hereinafter, for the ease of reference. However, in other embodiments, the TRPs 102, 104 and 106 may be configured differently. For example, in some embodiments, the TRP 104 or the TRP 106 may be configured as victim TRPs and the TRP 102 may be configured as an interfering TRP. Further, in some embodiments, a TRP may act as a victim TRP at one instance and the same TRP may act as an interfering TRP at a different instance.

As indicated above, in a dynamic time division duplex (TDD) system, the downlink and uplink transmission within one data frame is configurable. That means, in some embodiments, the downlink/uplink configuration could be different for neighboring TRPs in a dynamic TDD system. Therefore, in some embodiments, a downlink (DL) transmission from some TRPs may cause interference to other TRP's uplink (UL) reception, thereby causing inter-TRP interference. For example, in some embodiments, a DL transmission from the first interfering TRP 104 and a DL transmission from the second interfering TRP may interfere with a UL reception of the victim TRP 102. In other words, the victim TRP 102 experiences inter-TRP interference. In order to perform link adaptation and scheduling at the victim TRP 102, the victim TRP 102 should have information of a channel quality information CQI accurately. Further, in order to accurately determine the CQI, the victim TRP 102 should perform interference measurement, for example, inter-TRP interference measurement.

In some embodiments, the victim TRP 102 is configured to perform the inter-TRP interference measurement based on utilizing a guard period associated with a TDD data frame of the victim TRP 102. In some embodiments, a guard period comprises a time period between a downlink (DL) transmission period and an uplink (UL) transmission period associated with a TDD frame as shown in FIG. 2a and FIG. 2b, respectively. FIGS. 2a and 2b illustrates time division duplex (TDD) data frames 200 and 250, respectively, associated with a new radio (NR) communication system. For example, in some embodiments, the TDD frame 200 comprises a guard period 204 between a DL transmission period 202 (e.g., a physical downlink shared channel (PDSCH)) and an UL transmission period 206 (e.g., a physical uplink control channel (PUCCH)), as illustrated in FIG. 2a. Alternately, in some embodiments, the TDD frame 250 comprises a guard period 254 between a DL transmission period 252 (e.g., a physical downlink control channel (PDCCH)) and an UL transmission period 256 (e.g., a physical uplink shared channel (PUCCH)), as illustrated in FIG. 2b.

Therefore, in some embodiments, in order to determine the inter-TRP interference at the victim TRP 102, the victim TRP 102 is configured to receive and process one or more predefined interference signals respectively from one or more neighboring TRPs during a guard period of the victim TRP 102. For example, in this embodiment, the victim TRP 102 is configured to receive a first predefined interference signal 108 from the first interfering TRP 104 and a second predefined interference signal 110 from the second interfering TRP 106, during the guard period of the victim TRP 102. In such embodiments, the first interfering TRP 104 is configured to generate the first predefined interference signal 108 and provide the first predefined interference signal 108 to the victim TRP 102, during the guard period associated with the victim TRP 102. Further, the second interfering TRP 106 is also configured to generate the second predefined interference signal 110 and provide the second predefined interference signal 110 to the victim TRP 102, during the guard period associated with the victim TRP 102.

In some embodiments, the predefined interference signals (i.e., the first predefined interference signal 108 and the second predefined interference signal 110) comprises reference signals. For example, in some embodiments, the first predefined interference signal 108 and the second predefined interference signal 110 can comprise a channel state information reference signal (CSI-RS). In some embodiments, the CSI-RS comprises zero power CSI-RS (ZP CSI-RS) or non-zero power CSI-RS (NZP CSI-RS). However, in other embodiments, the predefined interference signals (i.e., the first predefined interference signal 108 and the second predefined interference signal 110) may comprise other signals, for example, other reference signals or any other predefined signal in NR communication systems.

In some embodiments, the first predefined interference signal 108 and the second predefined interference signal 110 may be precoded. In such embodiments, the first interfering TRP 104 may be configured to precode the first predefined interference signal 108 according to the traffic data to be scheduled for transmission from the first interfering TRP 104, prior to providing the first predefined interference signal 108 to the victim TRP 102. Similarly, in some embodiments, the second interfering TRP 106 may be configured to precode the second predefined interference signal 110 according to the traffic data to be scheduled for transmission from the second interfering TRP 106, prior to providing the second predefined interference signal 110 to the victim TRP 102. In some embodiments, precoding is utilized to reflect the interfering signal as accurately as possible. In some embodiments, the first interfering TRP 104 and the second interfering TRP 106 may further be configured to perform beamforming to their respective predefined interference signals, prior to providing the respective interference signals to the victim TRP.

Upon receiving the first predefined interference signal 108 and the second predefined interference signal 110, in some embodiments, the victim TRP 102 is configured to determine the inter-TRP interference at the victim TRP 102 based on processing the first predefined interference signal 108 and the second predefined interference signal 110. In this embodiment, the victim TRP 102 is shown to determine the inter-TRP interference based on processing the first predefined interference signal 108 and the second predefined interference signal 110 only. However, in other embodiments, the victim TRP 102 may be configured to determine the inter-TRP interference based on processing more or less than the above signals. For example, if there are additional interfering TRPs in the NR communication system 100, the victim TRP may be configured to determine the inter-TRP interference based on predefined interference signals from the additional neighboring TRPs (or interfering TRPs) as well.

In some embodiments, the victim TRP 102 is configured to measure the inter-TRP interference based on measuring a received power of the first predefined interference signal 108 and the second predefined interference signal 110. In some embodiments, the received power of the first predefined interference signal 108 and the second predefined interference signal 110 is indicative of the interference from the first interfering TRP 104 and the second interfering TRP 106. Further, in some embodiments, the victim TRP 102 is aware of the sequence or a time-frequency resource on which the first predefined interference signal 108 and the second predefined interference signal 110 is received at the victim TRP 102. Therefore, in some embodiments, the victim TRP can determine the inter-TRP interference contributed by the respective TRPs based on measuring the received power of the first predefined interference signal 108 and the second predefined interference signal 110 from the respective time-frequency resources. The above indicated method of determining the inter-TRP interference based on the measuring the received power of the first predefined interference signal 108 and the second predefined interference signal 110 is not construed to be limiting, and other methods of determining the inter-TRP interference based on measuring the received power of the first predefined interference signal 108 and the second predefined interference signal 110 are also contemplated to be within the scope of this disclosure. Once the inter-TRP interference is determined at the victim TRP 102, the victim TRP 012 may be configured to perform link adaptation for subsequent data transmission.

In some embodiments, the victim TRP 102 is configured to receive the first interference signal 108 and the second interference signal 110 on one or more time-frequency resources (e.g., subcarriers) associated with the guard period of the victim TRP 102, as indicated above. For example, in some embodiments, the victim TRP 102 is configured to receive the first predefined interference signal 108 on a first interfering signal resource and the second predefined interference signal 110 on a second interfering signal resource, respectively associated with the guard period of the victim TRP 102, as illustrated in FIG. 3. In some embodiments, both the first interfering signal resource and the second interfering signal resource can comprise one or more time-frequency resources or subcarriers associated with the guard period. FIG. 3 illustrates a signal structure of the interfering TRPs 104 and 106, within the guard period of the victim TRP 102, according to one embodiment of the disclosure. In particular, FIG. 3 illustrates a TDD frame 300 associated with a TRP (e.g., the victim TRP 102 in FIG. 1) having a guard period 302. In some embodiments, the victim TRP 102 is configured to receive the first interference signal 108 on a first resource 302a associated with the guard period 302. In some embodiments, the first resource 302a comprises the first interfering signal resource. Similarly, the victim TRP 102 is configured to receive the second interference signal 110 on a second resource 302b associated with the guard period 302. In some embodiments, the second resource 302b comprises the second interfering signal resource.

Therefore, referring to FIG. 1 again, in such embodiments, the first interfering TRP 104 is configured to provide the first predefined interference signal 108 to the victim TRP 102 on the first interfering signal resource, associated with the guard period of the victim TRP 102. Similarly, the second interfering TRP 106 is configured to provide the second predefined interference signal 110 to the victim TRP 102 on the second interfering signal resource, associated with the guard period of the victim TRP 102. In some embodiments, the first interfering TRP 104 and the second interfering TRP 106 are configured to determine the first interfering signal resource and the second interfering signal resource, respectively, within the guard period of the victim TRP 102, prior to providing their respective predefined interference signals 108 and 110 to the victim TRP 102. In some embodiments, the first interfering signal resource and the second interfering signal resource to be utilized by the first interfering TRP 104 and the second interfering TRP 106, respectively, may be predefined. In such embodiments, information on the first interfering signal resource to be utilized by the first interfering TRP 104 may be stored in a memory circuit associated with the first interfering TRP 104 and information on the second interfering signal resource to be utilized by the second interfering TRP 106 may be stored in a memory circuit associated with the second interfering TRP 106.

Further, in some embodiments, information on both the first interfering signal resource to be utilized by the first interfering TRP 104 and the second interfering signal resource to be utilized by the second interfering TRP 106 may be stored in a memory circuit associated with the victim TRP 102. In some embodiments, utilizing predefined interfering signal resources enables the victim TRP 102 to identify an interference received from the respective neighboring TRPs. In such embodiments, the first interfering TRP 104 and the second interfering TRP 106 are configured to determine the first interfering signal resource and the second interfering signal resource, respectively, based on information on the respective interfering signal resource stored in their respective memory circuits.

Alternately, in some embodiments, the first interfering signal resource and the second interfering signal resource to be utilized by the first interfering TRP 104 and the second interfering TRP 106, respectively, may be determined at the victim TRP 102 and provided to the first interfering TRP 104 and the second interfering TRP 106. In such embodiments, the victim TRP 102 may be configured to determine the first interfering signal resource and the second interfering signal resource associated with the guard period, to be utilized respectively, by the first interfering TRP 104 and the second interfering TRP 106, in order to send the respective predefined interference signals to the victim TRP 102. Upon determining the first interfering signal resource and the second interfering signal resource, in some embodiments, the victim TRP 102 may be configured to generate a configuration signal (not shown) comprising information on the first interfering signal resource or the second interfering signal resource both. In some embodiments, the victim TRP 102 is further configured to provide the configuration signal to the first interfering TRP 104 and the second interfering TRP 106, in order to configure the first interfering TRP 104 and the second interfering TRP 106 to send the corresponding predefined interference signals on the configured interfering signal resources. In some embodiments, the victim TRP 102 may be configured to generate one or more configuration signals to be provided respectively to the one or more interfering TRPs, in order to configure the one or more interfering TRPs to send the corresponding predefined interference signals on the configured/determined interfering signal resources.

In some embodiments, the victim TRP 102 is configured to provide the configuration signal to the first interfering TRP 104 and the second interfering TRP 106 via higher level signaling, for example, using a NR minimum system information (MSI), remaining minimum system information (RMSI), other system information (OSI) etc. or other signals defined in NR systems. However, in other embodiments, the victim TRP 102 may be configured to provide the configuration signal to the first interfering TRP 104 and the second interfering TRP 106, differently than above, for example, using other radio resource control (RRC) signaling. Therefore, in such embodiments, the first interfering TRP 104 and the second interfering TRP 106 are configured to determine the first interfering signal resource and the second interfering signal resource, respectively, based on processing the configuration signal received from the victim TRP 102. Alternately, in some embodiments, the first interfering TRP 104 and the second interfering TRP 106 may configured to determine the first interfering signal resource and the second interfering signal resource, respectively, within the guard period of the victim TRP 102, based on some other criteria, or randomly.

Figure 4:
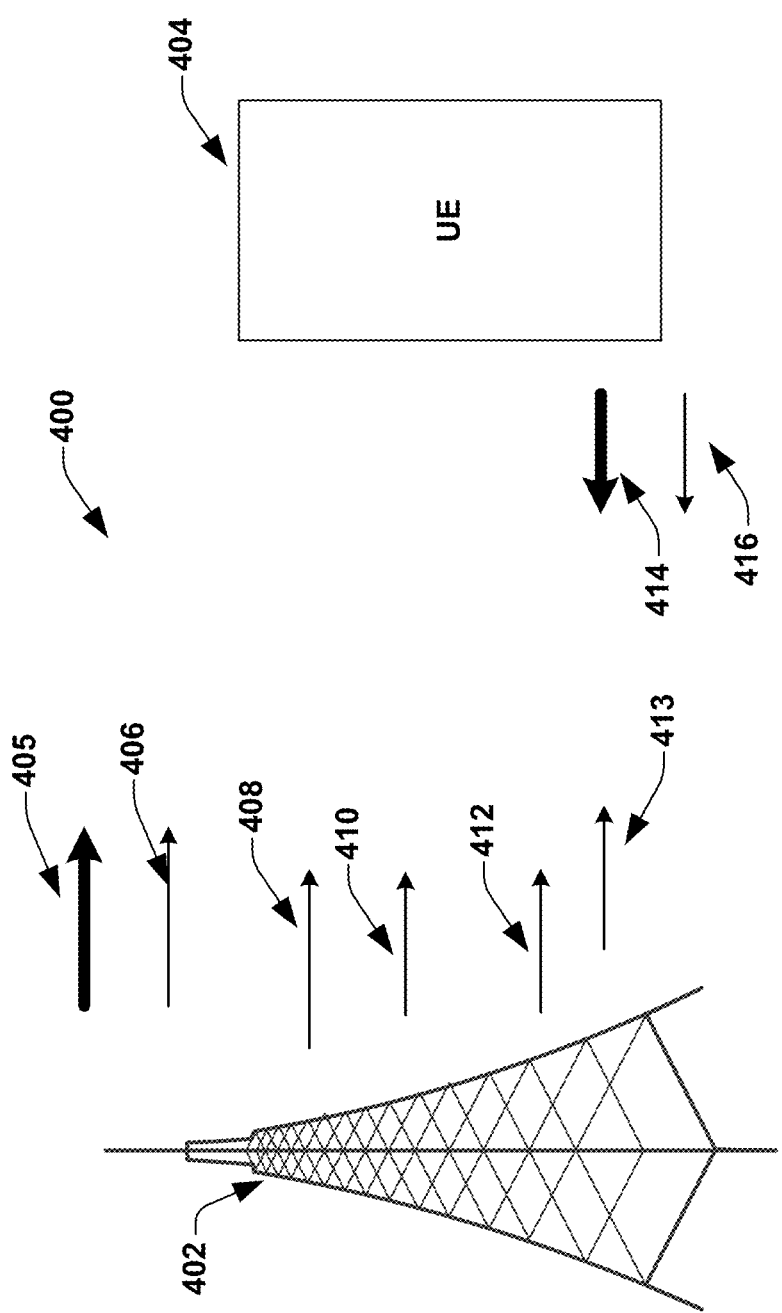
FIG. 4 illustrates a simplified block diagram of a new radio (NR) communication system, according to another embodiment of the disclosure.

FIG. 4 illustrates a simplified block diagram of a new radio (NR) communication system 400, according to another embodiment of the disclosure. The NR communication system 400 comprises a transmission reception point (TRP) 202 and a user equipment (UE) 404. However, in other embodiments, the NR communication system 400 can comprise a plurality of TRPs and UEs. In some embodiments, the TRP 402 is equivalent to a base station, an eNodeB in LTE, gNodeB etc. In some embodiments, the UE 404 may comprise a mobile phone, tablet computer etc. The TRP 402 and the UE 404 are configured to communicate with one another over a communication medium (e.g., air). In some embodiments, both the TRP 402 and the UE 404 support multi-beam operation.

In some embodiments, the UE 404 is configured to determine a channel state information (CSI). In some embodiments, determining a CSI comprises determining a channel quality indicator (CaI). In some embodiments, determining the CSI further includes determining a precoding matrix indicator (PMI) and a rank indicator (RI). In some embodiments, the UE 404 is configured to determine a signal to interference and noise ratio (SINR), in order to determine/derive the CSI. In some embodiments, determining the SINR enables the UE 404 to determine the CQI associated with the CSI. In some embodiments, the UE 404 is configured to determine the CSI, in response to receiving a CSI report request signal 405 from the TRP 402. In some embodiments, the CSI report request signal 405 comprises a request to determine the CSI. In such embodiments, the TRP 402 is configured to generate and provide the CSI report request signal 405 to the UE 404. However, in other embodiments, the UE 404 may be configured to determine the CSI even without receiving the CSI report request signal 405 from the TRP 402.

In some embodiments, the UE 404 is configured to determine the CSI based on processing one or more IMRs (e.g., reference signals) associated with the TRP 402. In some embodiments, the IMRs comprise predetermined resources, for example, predetermined interference measurement (IM) signals configured to be utilized for interference measurement. In other words, the IMR comprises a predetermined resource or a signal that allows a UE/TRP to determine interference characteristics. In some embodiments, the IMRs comprise reference signals associated with the TRP 402, for example, CSI-RS. However, in other embodiments, other IMRs, for example, other signals could also be utilized for interference measurement. In some embodiments, information on the one or more IMRs utilized by the UE 404 to determine the CSI is provided to the UE 404 by the TRP 402. In order to provide the information on the one or more IMRs to the UE 404, in some embodiments, the TRP 402 is configured to generate and provide an interference measurement resource (IMR) configuration signal 406 to the UE 404. In some embodiments, the IMR configuration signal 406 comprises an interference measurement resource (IMR) configuration for the UE 404. In some embodiments, the IMR configuration comprises a configuration information associated with a set of IMRs configured to be utilized for CSI measurement at the UE 404. In some embodiments, the TRP 402 is further configured to determine the IMR configuration, prior to generating the IMR configuration signal 406.

In some embodiments, the configuration information within the IMR configuration for the UE 404 comprises information that define the set of IMRs configured for CSI measurement. For example, in some embodiments, the IMR configuration comprises information on one or more of the type of the set of IMRs to be utilized by the UE 404, a resource configuration associated with the set of IMRs (e.g., a configuration over the time and frequency domain like periodicity in time domain and density over frequency domain) etc. In some embodiments, the set of IMRs comprise one or more reference signals (RS) associated with the TRP 402. In some embodiments, the TRP 402 is further configured to generate and provide the set of IMRs (e.g., the one or more RS) to the UE 402, in order to enable the UE 404 to determine the CSI. In some embodiments, the set of IMRs may be provided by the TRP 402 to the UE 404 in same slot or in different slots. In such embodiments, the UE 404 is further configured to receive and process the IMR configuration signal 406, in order to determine the IMR configuration of the UE 404, prior to determining the CSI. In some embodiments, processing the IMR configuration signal 406 enables the UE 404 to determine the configuration information associated with the set of IMRs configured for CSI measurement at the UE 404. In some embodiments, the TRP 402 is configured to provide the IMR configuration signal 406 to the UE 404 via radio resource control (RRC) signaling or downlink control information (DCI).

In one example embodiment, the set of IMRs within the IMR configuration comprise a channel state information reference signal (CSI-RS) and/or a demodulation reference signal (DM-RS) associated with the TRP 402. However, in other embodiments, the set of IMRs within the IMR configuration can comprise other signals, for example, other reference signals. In some embodiments, the CSI-RS comprises zero power CSI-RS (ZP CSI-RS) or non-zero power CSI-RS (NZP CSI-RS). In some embodiments, the ZP CSI-RS is utilized for inter cell interference measurement and NZP CSI-RS is utilized for intra cell interference measurement in the scenario of multi user MIMO (MU-MIMO). In some embodiments, the TRP 402 is configured to determine the IMR configuration based on measurement restrictions configured for the UE 404. For example, in some embodiments, if wide band interference measurement restriction is configured for the UE 404, then DM-RS is not used for interference (or CSI) measurement purpose if the UE is not allocated full-band resource. In such embodiments, only channel estimation is performed based on DM-RS. Therefore, in such embodiments, the IMR configuration determined by the TRP 402 may comprise only CSI-RS. However, if partial band measurement restriction is configured for the UE 404, then DM-RS is allowed to be used for interference measurement besides CSI-RS. Therefore, in such embodiments, the IMR configuration determined by the TRP 402 comprises both DM-RS and CSI-RS.

In some embodiments, the TRP 402 is further configured to generate and provide a channel state information (CSI) report indicator signal 408 to the UE 404, in order to enable the UE 404 to determine the CSI. In some embodiments, the CSI report indicator signal 408 comprises an indication on one or more IMRs from the set of IMRs in the IMR configuration, to be utilized by the UE 404 to determine the CSI. For example, in some embodiments, when the IMR configuration comprises the CSI-RS and the DM-RS, the one or more IMRs indicated in the CSI report indicator signal 408 may comprise the CSI-RS or DM-RS, or both. In some embodiments, the TRP 402 is configured to provide CSI report indicator signal 408 to the UE 404 via radio resource control (RRC) signaling or downlink control information (DCI).

In some embodiments, the CSI report indicator signal 408 comprises an N-bit indicator that indicates the one or more IMRs to be utilized to determine the CSI. Table 1 below shows an example of the CSI report indicator signal 408, when the IMR configuration comprises the CSI-RS and DM-RS.

TABLE 1

CSI report indicator signal structure

| CSI Report Indicator Signal | Indication |
|---|---|
| 00 | CSI calculated based on CSI-RS only |
| 01 | CSI calculated based on DM-RS only |
| 10 | CSI calculated based on joint DM-RS and CSI-RS |
| 11 | reserved |

In typical implementations, DM-RS is utilized to determine single user MIMO (SU-MIMO) CSI and CSI-RS is utilized to determine multi user MIMO (MU-MIMO). In such embodiments, the UE 404 is further configured to receive and process the CSI report indicator signal 408, prior to determining the CSI. Upon processing the CSI report indicator signal 408, in some embodiments, the UE 404 is configured to determine the CSI based on the one or more IMRs indicated in the CSI report indicator signal 408. For example, in some embodiments, the UE 404 is configured to determine the CSI based on CSI-RS only or based or DM-RS only, or based on both CSI-RS and DM-RS, according to the indication in the CSI report indicator signal 408.

In some embodiments, the IMR transmission from the TRP 402 to the UE 404 may be periodic or semi-persistent (SPS) or aperiodic. Therefore, in some embodiments, the TRP 402 is further configured to generate and provide a periodicity indicator signal 410 to the UE 404. In some embodiments, the periodicity indicator signal 410 provides an indication to the UE 404 about a periodicity of at least one IMR of the set of IMRs, to be utilized by the UE to determine the CSI. For example, when the IMR configuration comprises CSI-RS, the periodicity indicator signal 410 indicates to the UE 404 to determine the CSI based on a periodic (or SPS) CSI-RS or aperiodic CSI-RS. In some embodiments, the periodicity indicator signal 410 comprises a 1-bit indicator to indicate whether periodic CSI-RS or semi-periodic CSI-RS or aperiodic CSI-RS is to be utilized to determine CSI. For example, in some embodiments, a value 0 may indicate that the CSI is to be determined based on periodic (or SPS) CSI-RS and a value 1 may indicate that the CSI is to be determined based on aperiodic CSI-RS. In some embodiments, the TRP 402 is configured to provide the periodicity indicator signal 410 to the UE 404 via downlink control information (DCI). In such embodiments, the UE 404 is further configured to receive and process the periodicity indicator signal 410, in order to determine the periodicity of the one or more IMRs to be utilized to determine the CSI, prior to determining the CSI.

In some embodiments, the UE 404 and the TRP 402 can maintain several UE beams and TRP beams, respectively. In order to get accurate CSI measurement, IMRs utilized for CSI measurement should be associated with a same UE receive (Rx) beam, since the interference characteristics for different beams could vary a lot. Therefore, in some embodiments, the TRP 402 is further configured to generate and provide a UE beam indicator signal 412 to the UE 404. In some embodiments, the UE beam indicator signal 412 comprises information on a UE receive (Rx) beam, to be utilized by the UE 404 to receive the set of IMRs, in order to enable the UE to determine the CSI based on the set of IMRs associated with the same UE Rx beam. In some embodiments, the UE beam indicator signal 412 is provided to the UE 404 via downlink control information (DCI). In such embodiments, the UE 404 is further configured to receive and process the UE beam indicator signal 412, in order to determine the UE Rx beam associated with the set of IMRs to be utilized to determine the CSI, prior to determining the CSI.

In some embodiments, the TRP 402 is further configured to generate and provide a quasi co-location (QCL) indication signal 413 to the UE 404. In some embodiments, the QCL indication signal 413 comprises information on a QCL between the set of IMRs, for example, the CSI-RS and DM-RS. In some embodiments, the QCL indication signal 413 comprises information on at least the QCL for DM-RS and one process for CSI-RS. In some embodiments, the QCL indicator signal 413 is provided to the UE 404 by higher level signaling or DCI. In such embodiments, the UE 404 is further configured to receive and process the QCL indication signal 413, in order to determine the QCL of the set of IMRs to be utilized to determine the CSI, prior to determining the CSI.

In some embodiments, information on the one or more IMRs (e.g., the reference signals) to be utilized by the UE 404 to determine the CSI, is received at the UE 404 based on processing one or more of the above signals (e.g., the IMR configuration signal 406, CSI report indicator signal 408 etc.). Upon determining information on the one or more IMRs, in some embodiments, the UE 404 is configured to process the one or more IMRs, in order to determine the CSI. In some embodiments, the UE 404 is configured to derive/determine the CSI based on determining an SINR based on the one or more IMRs. In some embodiments, the SINR enables to determine a CQI associated with the CSI. In some embodiments, the UE 404 is configured to determine the SINR, at least partly, based on measuring a received signal power of the one or more IMRs. However, the above indicated method of determining the CSI based on the one or more IMRs is not construed to be limiting and other methods of determining the CSI based on the one or more IMRs are also contemplated to be within the scope of this disclosure.

Upon determining the CSI, in some embodiments, the UE 404 is further configured to report the determined CSI to the TRP 402, via a CSI report signal 414. In some embodiments, the UE 404 is further configured to provide an IMR indicator signal 416 comprising information on the IMR utilized to determine the CSI comprised in the CSI report signal 414. For example, in some embodiments, the IMR indicator signal 416 may comprise an indication on whether the CSI is determined based on CSI-RS only or DM-RS only, or both DM-RS and CSI-RS.

Figure 5A:
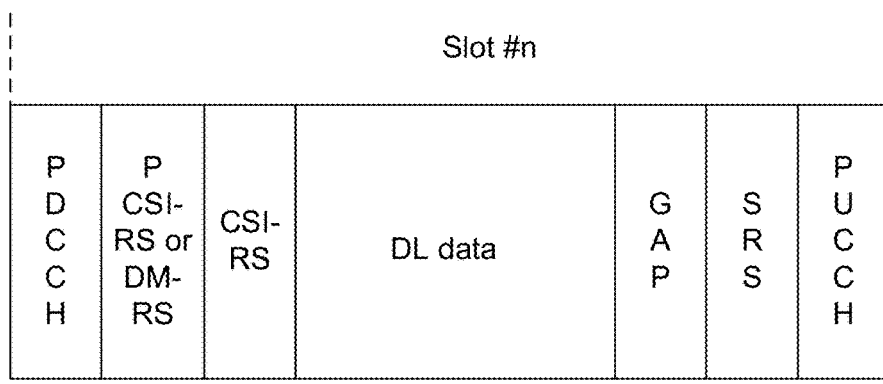
FIG. 5a and FIG. 5b illustrates a slot structure for slot #n during downlink transmission comprising DL-RS and UL-RS from neighboring TRPs and UEs respectively, in order to enable a UE to determine the cross-link interference in the DL for slot #n+1, according to one embodiment of the disclosure.
Figure 5B:
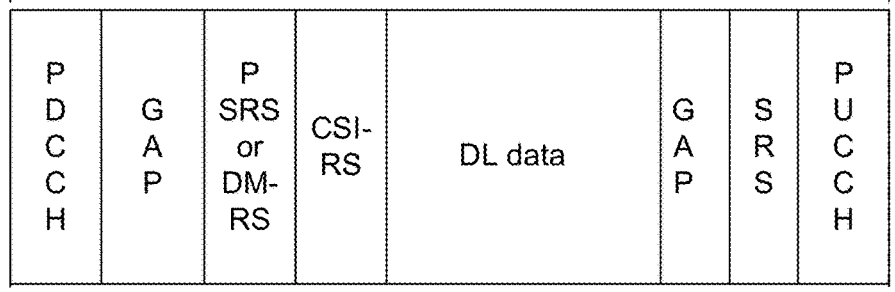

In some embodiments, in order get accurate CSI (or determine SINR), the UE 404 is further configured to perform cross-link interference measurement during downlink transmission. In such embodiments, the UE 404 may be configured to measure interference based on downlink RS (DL-RS) from neighboring TRPs (not shown), for example, ZP CSI-RS, NZP CSI-RS, DM-RS etc. and/or uplink RS (UL-RS) from neighboring UEs (not shown), for example, sounding reference signal (SRS), in order to determine the CSI. In some embodiments, the DL-RS from the neighboring TRPs and the UL-RS from the neighboring UEs may be precoded, for example, precoded CSI-RS (P CSI-RS), precoded sounding reference signal (P-SRS), DM-RS etc., in order to get accurate interference information. FIG. 5a and FIG. 5b illustrates a slot structure for slot #n during downlink transmission comprising DL-RS and UL-RS from neighboring TRPs and UEs respectively, in order to enable the UE 404 to determine the cross-link interference for slot #n+1.

In one example embodiment, UE 404 performs channel estimation based on measuring a received power of a UE specific DL-RS (e.g., NZP CSI-RS) and then subtracting the estimation of received desired signal (i.e., the UE specific NZP CSI-RS) from the whole received signal power (including NZP CSI-RS from neighboring TRPs and UL-RS from neighboring UEs) to accomplish the intra-cell and inter-cell interference measurement. Further, in another example embodiment, UE 404 may utilize the NZP CSI-RS transmitted to other neighboring UEs to estimate the channel, denoted as $H_i$. In such embodiments, the UE can obtain the intra-cell interference from a given UE as $R_i = H_i * H_i^H$, where $(\cdot)^H$ is the transpose conjugate operation. Further, in other embodiments, other methods of determining the inter-cell or intra-cell interference is contemplated to be within the scope of this disclosure. In some embodiments, in order to enable cross link interference measurement for a neighboring UE (not shown), the TRP 402 may be configured to generate one or more precoded downlink reference signals (DL-RS), for example, P CSI-RS.

Figure 5C:
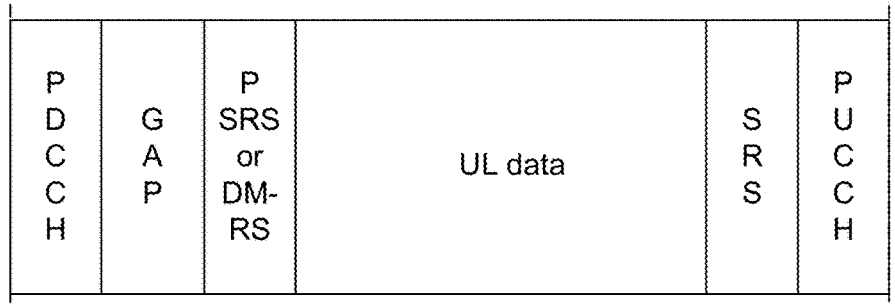
FIG. 5c and FIG. 5d illustrates a slot structure for slot #n during uplink transmission comprising DL-RS and UL-RS from neighboring TRPs and UEs respectively, in order to enable a TRP to determine the cross-link interference in the UL for slot #n+1, according to one embodiment of the disclosure.
Figure 5D:
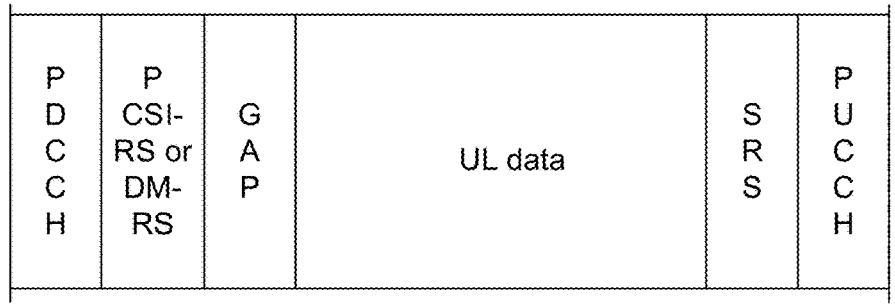

Similarly, in some embodiments, in order get accurate CSI (or determine SINR), the TRP 402 may be configured to perform cross-link interference measurement during uplink transmission. In such embodiments, the TRP 402 may be configured to measure interference based on downlink RS (DL-RS) from neighboring TRPs (not shown), for example, ZP CSI-RS, NZP CSI-RS, DM-RS etc. and/or uplink RS (UL-RS) from neighboring UEs (not shown), for example, sounding reference signal (SRS), in order to determine the CSI. In some embodiments, the DL-RS from the neighboring TRPs and the UL-RS from the neighboring UEs may be precoded, for example, precoded CSI-RS (P CSI-RS), precoded SRS (P-SRS), DM-RS etc., in order to get accurate interference information. FIG. 5c and FIG. 5d illustrates a slot structure for slot #n during uplink transmission comprising DL-RS and UL-RS from neighboring TRPs and UEs respectively, in order to enable the TRP 402 to determine the cross-link interference for slot #n+1. In some embodiments, the TRP 402 may be configured to measure interference based on processing the DL-RS or UL-RS based on methods similar to that indicated above with respect to the UE 404. However, in other embodiments, other methods of determining the interference is also contemplated to be within the scope of this disclosure. In some embodiments, in order to enable cross link interference measurement for a neighboring TRP (not shown), the UE 404 may be configured to generate one or more precoded uplink reference signals (UL-RS), for example, P SRS.

Referring to FIG. 6, illustrated is a block diagram of an apparatus 600 employable at a Base Station (BS), eNodeB, gNodeB, a transmission reception point (TRP) or other network device, in accordance with the various aspects described herein. Apparatus 600 can include one or more processors 610 (e.g., one or more baseband processors such as one or more of the baseband processors discussed in connection with FIG. 13 and/or FIG. 14) comprising processing circuitry and associated interface(s) (e.g., one or more interface(s) discussed in connection with FIG. 14), communication circuitry 620 (e.g., which can comprise circuitry for one or more wired (e.g., X2, etc.) connections and/or part or all of RF circuitry 1306 in FIG. 3, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 630 (which can comprise any of a variety of storage mediums and can store instructions and/or data associated with one or more of processor(s) 610 or communication circuitry 620). In various aspects, the apparatus 600 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 610, communication circuitry 620, and the memory 630 can be included in a single device, while in other aspects, they can be included in different devices, such as part of a distributed architecture.

In a first embodiment, the apparatus 600 is included within the victim TRP 102 in FIG. 1. In such embodiments, the apparatus 600 enables to determine inter-TRP interference at the victim TRP 102 during a guard period associated with the victim TRP 102. In this embodiment, the apparatus 600 is shown to be included within the victim TRP 102 in FIG. 1. However, in other embodiments, the apparatus 600 could be included within any TRP, in order to determine an inter-TRP interference associated therewith. The apparatus 600 is explained herein with reference to the victim TRP 102 in FIG. 1. In some embodiments, the processing circuit 610 is configured to process one or more predefined interference signals (e.g., the first predefined interference signal 108 and the second predefined interference signal 110) respectively received from one or more interfering TRPs (e.g., the TRP 104 and the TRP 106) during a guard period of the victim TRP (e.g., the victim TRP 102). In some embodiments, the processing circuit 610 is configured to receive the one or more predefined interference signals from the interfering TRPs via the communication circuitry 620. In some embodiments, the guard period comprises a time period between a downlink (DL) transmission period and an uplink (UL) transmission period associated with a time division duplex (TDD) frame of a TRP (e.g., the victim TRP 102), as indicated in FIG. 2a and FIG. 2b.

In some embodiments, the one or more predefined interference signals comprises reference signals. For example, in some embodiments, the one or more predefined interference signals comprises channel state information reference signals (CSI-RS). In some embodiments, at least one of the one or more predefined interference signals is pre-coded. In some embodiments, the one or more predefined interference signals are received at the processing circuit 610 on one or more interfering signal resources (e.g., the first interfering signal resource and the second interfering signal resource) respectively associated with the guard period of the victim TRP. In some embodiments, each of the one or more interfering signal resources comprises one or more time-frequency resources (or subcarriers) associated with the guard period of the victim TRP. Upon processing the one or more predefined interference signals, the processing circuit 610 is further configured to determine an inter-TRP interference based on the one or more predefined interference signals. In some embodiments, the inter-TRP interference comprises a measurement of an uplink (UL) interference at the victim TRP from the one or more interfering TRPs.

In some embodiments, the processing circuit 610 is further configured to determine the one or more interfering signal resources that is to be utilized respectively by the one or more interfering TRPs, in order to send their respective predefined interference signals. For example, in this embodiment, the processing circuit 610 is configured to determine the first interfering signal resource to be utilized by the first interfering TRP 104 and the second interfering signal resource to be utilized by the second interfering TRP 106, in order to send their respecting predefined interfering signals. In such embodiments, the processing circuit 610 is further configured to generate a configuration signal comprising information on the determined interfering signal resources (i.e., the first interfering signal resource and the second interfering signal resource) associated with the guard period, to be provided to the one or more interfering TRPs, in order to configure the one or more interfering TRPs to send the corresponding predefined interference signals on the determined interfering signal resources.

In a second embodiment, the apparatus 600 is included within the first interfering TRP 104 in FIG. 1. In such embodiments, the apparatus 600 enables a victim TRP (e.g., the victim TRP 102 in FIG. 1) to determine inter-TRP interference during a guard period associated with the victim TRP. In this embodiment, the apparatus 600 is shown to be included within the first interfering TRP 104 in FIG. 1. However, in other embodiments, the apparatus 600 could be included with the second interfering TRP 106. Further, in other embodiments, the apparatus 600 could be included within any interfering TRP, in order to enable a victim TRP determine an inter-TRP interference. The apparatus 600 is explained herein with reference to the first interfering TRP 104 in FIG. 1. In some embodiments, the processing circuit 610 is configured to generate a predefined interference signal (e.g., the first predefined interference signal 108 in FIG. 1), to be provided to a victim TRP (e.g., the victim TRP 102) during a guard period of the victim TRP. In some embodiments, providing the predefined interference signal during the guard period enables the victim TRP to determine an inter-TRP interference. In some embodiments, the guard period comprises a time period between a downlink (DL) transmission period and an uplink (UL) transmission period associated with a time division duplex (TDD) frame of the victim TRP, as indicated in FIG. 2a and FIG. 2b.

In some embodiments, the predefined interference signal comprises a reference signal. In some embodiments, the predefined interference signal comprises a channel state information reference signal (CSI-RS). In some embodiments, the processing circuit 610 is further configured to determine an interfering signal resource (e.g., the first interfering signal resource) within the guard period of the victim TRP, to be utilized by the processing circuit 610, for a transmission of the generated predefined interference signal. In some embodiments, the interfering signal resource comprises one or more time-frequency resources within the guard period of the victim TRP. In some embodiments, the processing circuit 610 is configured to determine the interfering signal resource to be utilized for the transmission of the predefined interference signal, based on processing a configuration signal comprising information on the interfering signal resource, received from the victim TRP. However, in other embodiments, the processing circuit 610 is configured to determine the interfering signal resource to be utilized for the transmission of the predefined interference signal, based on predefined information stored in the memory circuit 630 of the interfering TRP. In such embodiments, information on the interfering signal resource to be utilized by the TRP for the transmission of the predefined interference signal is predefined. Alternately, in some embodiments, the processing circuit 610 is configured to determine the interfering signal resource to be utilized for the transmission of the predefined interference signal randomly within the guard period of the victim TRP.

Upon determining the interfering signal resource to be utilized for the transmission of the predefined interfering signal, in some embodiments, the processing circuit 610 is further configured to generate a transmission of the predefined interfering signal using the determined interfering signal resource. In some embodiments, generating the transmission of the predefined interfering signal comprises mapping the predefined interfering signal to the determined interfering signal resource, in order to subsequently provide the predefined interfering signal to the victim TRP (e.g., the victim TRP 102). In some embodiments, the processing circuit 610 is further configured to provide the generated transmission of the predefined interfering signal to the communication circuitry 620 (e.g., a radio frequency (RF) circuitry), via a RF interface associated with the processing circuit 610, for subsequent transmission of the predefined interfering signal to the victim TRP. In some embodiments, the processing circuit 610 is further configured to precode the predefined interference signal, prior to generating the transmission of the predefined interference signal using the determined interfering signal resource.

In a third embodiment, the apparatus 600 is included within the TRP 402 in FIG. 4. In such embodiments, the apparatus 600 configures one or more interference measurement resources (IMRs) to be utilized by a UE to determine channel state information (CSI) or interference. In this embodiment, the apparatus 600 is shown to be included within the TRP 402 in FIG. 4. However, in other embodiments, the apparatus 600 could be included within any TRP associated with an NR communication system. The apparatus 600 is explained herein with reference to the TRP 402 in FIG. 4. In some embodiments, the processing circuit 610 is configured to generate a CSI report request signal 405 (e.g., CSI report request signal 405 in FIG. 5) to be provided to a UE (e.g., the UE 404 in FIG. 4) via the transceiver circuitry 620. In some embodiments, the CSI report request signal comprises a request to report a CSI determined at the UE. In some embodiments, the processing circuit 610 is further configured to determine an interference measurement resource (IMR) configuration for the user equipment (UE) (e.g., the UE 404). In some embodiments, the IMR configuration comprises a configuration information associated with a set of IMRs configured to be utilized for channel state information (CSI) measurement at the UE. In some embodiments, the processing circuit 610 is further configured to configure the set of IMRs. In some embodiments, the processing circuit 610 is configured to determine the IMR configuration based on a measurement restriction configured for the UE, as explained above with respect to FIG. 4.

In some embodiments, the set of IMRs in the IMR configuration comprises one or more reference signals associated with the TRP (i.e., the TRP 402). In some embodiments, the processing circuit 610 is further configured to generate and provide the set of IMRs to the UE, in order to enable the UE to determine the CSI. In some embodiments, the set of IMRs in the IMR configuration comprises a channel state information reference signal (CSI-RS) and a demodulation reference signal (DM-RS). Upon determining the IMR configuration, in some embodiments, the processing circuit 610 is further configured to generate an IMR configuration signal (e.g., the IMR configuration signal 406 in FIG. 4) comprising the determined IMR configuration, to be provided to UE, in order to provide information on the determined IMR configuration to the UE. In some embodiments, the processing circuit 610 is further configured to provide the IMR configuration signal to the communication circuitry 620 (e.g., an RF circuitry), via an RF interface associated with the processing circuit 610, in order to subsequently provide the IMR configuration signal to the UE.

In some embodiments, the processing circuit 610 is further configured to generate a channel state information (CSI) report indicator signal (e.g., the CSI report indicator signal 408) and provide the CSI report indicator signal to the communication circuitry 620 for subsequent transmission to the UE. In some embodiments, the CSI report indicator signal comprises an indication on one or more IMRs from the set of IMRs in the IMR configuration, to be utilized by the UE to determine the CSI. In some embodiments, when the IMR configuration is based on DM-RS and CSI-RS, the one or more IMRs in the CSI report indicator signal comprises the CSI-RS only or the DM-RS only, or both. That is, in some embodiments, the CSI report indicator signal may indicate to the UE to determine the CSI based on CSI-RS only or DM-RS only or, both CSI-RS and DM-RS. In some embodiments, the processing circuit 610 is configured to provide the IMR configuration signal or CSI report indicator signal, or both, to the UE via radio resource control (RRC) signaling or downlink control information (DCI). However, in other embodiments, the processing circuit 610 may be configured to provide the IMR configuration signal or CSI report indicator signal, or both, to the UE differently.

In some embodiments, the processing circuit 610 is further configured to generate a periodicity indicator signal (e.g., the periodicity indicator signal 410 in FIG. 4) and provide the periodicity indicator signal to the communication circuitry 620 for subsequent transmission to the UE. In some embodiments, the periodicity indicator signal provides an indication or information to the UE about a periodicity of at least one IMR of the set of IMRs, to be utilized by the UE to determine the CSI. For example, in some embodiments, the periodicity indicator signal indicates to the UE to determine the CSI based on a periodic (or SPS) CSI-RS or aperiodic CSI-RS, as explained above with respect to FIG. 4. In some embodiments, the processing circuit 610 is further configured to generate a UE beam indicator signal (e.g., the UE beam indicator signal 412 in FIG. 4) and provide the UE beam indicator signal to the communication circuitry 620 for subsequent transmission to the UE. In some embodiments, the UE beam indicator signal comprises information on a UE receive (Rx) beam, to be utilized by the UE to receive the set of IMRs, in order to enable the UE to determine the CSI based on the set of IMRs associated with the same UE Rx beam. For example, in some embodiments, the UE beam indicator signal comprises information on the UE Rx beam associated with the DM-RS and CSI-RS to be utilized to determine the CSI.

In some embodiments, the processing circuit 610 is further configured to generate quasi co-location (QCL) indication signal (e.g., the QCL indication signal 413 in FIG. 4) and provide the QCL indication signal to the communication circuitry 620 for subsequent transmission to the UE. In some embodiments, the QCL indication signal comprises information on a QCL between the set of IMRs, for example, the CSI-RS and DM-RS. In some embodiments, the processing circuit 610 is configured to provide the QCL indicator signal to the UE by higher level signaling or DCI. In some embodiments, the processing circuit 610 is further configured to generate one or more precoded downlink reference signals (DL-RS) to be utilized for cross-link interference measurement, as explained above with respect to FIG. 4. In some embodiments, the processing circuit 610 is further configured to measure cross-link interference in the uplink (UL), based on receiving downlink reference signals (DL-RS) from one or more neighboring TRPs and UL reference signals (UL-RS) from one or more UEs, as explained above with respect to FIG. 4.

Referring to FIG. 7, illustrated is a block diagram of an apparatus 700 employable at a UE or other network device (e.g., IoT device) that facilitates to determine channel state information (CSI), according to various aspects described herein. Apparatus 700 can include one or more processors 710 (e.g., one or more baseband processors such as one or more of the baseband processors discussed in connection with FIG. 13 and/or FIG. 14) comprising processing circuitry and associated interface(s) (e.g., one or more interface(s) discussed in connection with FIG. 14), transceiver circuitry 720 (e.g., comprising part or all of RF circuitry 1306 in FIG. 13, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 730 (which can comprise any of a variety of storage mediums and can store instructions and/or data associated with one or more of processor(s) 710 or transceiver circuitry 720). In various aspects, apparatus 700 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 710) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410) can comprise one or more of: identifying physical resources associated with the signal/message, detecting the signal/message, resource element group deinterleaving, demodulation, descrambling, and/or decoding.

In some embodiments, the apparatus 700 is included within the UE 404 in FIG. 4. In such embodiments, the apparatus 700 determines a CSI based on one or more interference measurement resources (IMRs) configured by a TRP (e.g., the TRP 402). In other embodiments, however, the apparatus 700 could be included within any UE associated with a new radio (NR) communication system. In some embodiments, the processing circuit 710 is configured to process a CSI report request signal 405 (e.g., CSI report request signal 405 in FIG. 5) received from a TRP (e.g., the TRP 402 in FIG. 4) via the transceiver circuitry 720. In some embodiments, the CSI report request signal comprises a request to report a CSI determined at the UE. Upon processing the CSI report request signal, in some embodiments, the processing circuit 710 is configured to determine the CSI. In some embodiments, the processing circuit 710 is configured to determine the CSI based on processing one or more IMRs associated with the TRP (e.g., the TRP 404 in FIG. 4). In some embodiments, information on the one or more IMRs to be utilized to determine the CSI is received from the TRP. In such embodiments, the processing circuit 710 is further configured to process an interference measurement resource (IMR) configuration signal (e.g., the IMR configuration signal 406 in FIG. 4), received from a TRP (e.g., the TRP 402 in FIG. 4) via the transceiver circuitry 720, prior to determining the CSI. In some embodiments, the IMR configuration signal comprises an IMR configuration for the UE (e.g., the UE 404 in FIG. 4). In some embodiments, IMR configuration comprises a configuration information associated with a set of IMRs configured to be utilized for channel state information (CSI) measurement at the UE. In some embodiments, the set of IMRs in the IMR configuration comprises one or more reference signals associated with the TRP. In some embodiments, the set of IMRs in the IMR configuration comprises a channel state information reference signal (CSI-RS) and a demodulation reference signal (DM-RS).

In some embodiments, the processing circuit 710 is further configured to process a channel state information (CSI) report indicator signal (e.g., the CSI report indicator signal 408 in FIG. 4), received from the TRP via the transceiver circuitry 720, prior to determining the CSI. In some embodiments, the CSI report indicator signal comprises an indication on one or more IMRs from the set of IMRs in the IMR configuration, to be utilized by the UE to determine the CSI. For example, in some embodiments, when the set of IMRs in the IMR configuration comprises a CSI-RS and the DM-RS, the one or more IMRs indicated in the CSI report indicator signal comprises CSI-RS only or DM-RS only or both DM-RS and CSI-RS, as indicated above in Table 1. In some embodiments, the processing circuit 710 is further configured to process a UE beam indicator signal (e.g., the UE beam indicator signal 412 in FIG. 4), received from the TRP via the transceiver circuitry 720, prior to determining the CSI. In some embodiments, the UE beam indicator signal comprises information on a UE receive (Rx) beam associated with the set of IMRs, to be utilized by the UE, in order to determine the CSI, as explained above with respect to FIG. 4.

In some embodiments, the processing circuit 710 is further configured to process a periodicity indicator signal (e.g., the periodicity indicator signal 410 in FIG. 4), received from the TRP via the transceiver circuitry 720, prior to determining the CSI. In some embodiments, the periodicity indicator signal comprises an indication about a periodicity of at least one IMR of the set of IMRs, to be utilized by the UE to determine the CSI. In some embodiments, the processing circuit 710 is further configured to process a quasi co-location (QCL) indication signal (e.g., the QCL indication signal 413 in FIG. 4) received from the TRP via the transceiver circuitry 720, prior to determining the CSI. In some embodiments, the QCL indication signal comprises information on a QCL between the one or more IMRs, for example, the CSI-RS and DM-RS.

Upon determining the CSI, the processing circuit 710 is further configured to generate a CSI report signal (e.g., the CSI report signal 414 in FIG. 4) comprising the determined CSI. In some embodiments, the processing circuit 710 is further configured to provide an IMR indicator signal (e.g., the IMR indicator signal 416) comprising information on the IMR utilized to determine the CSI comprised in the CSI report signal. In some embodiments, the processing circuit 710 is further configured to generate one or more precoded uplink reference signals (UL-RS) to be utilized for cross-link interference measurement, as explained above with respect to FIG. 4. In some embodiments, the processing circuit 710 is further configured to measure cross-link interference in the downlink (DL), based on receiving downlink reference signals (DL-RS) from one or more neighboring TRPs and UL reference signals (UL-RS) from one or more UEs, as explained above with respect to FIG. 4.

Figure 8:
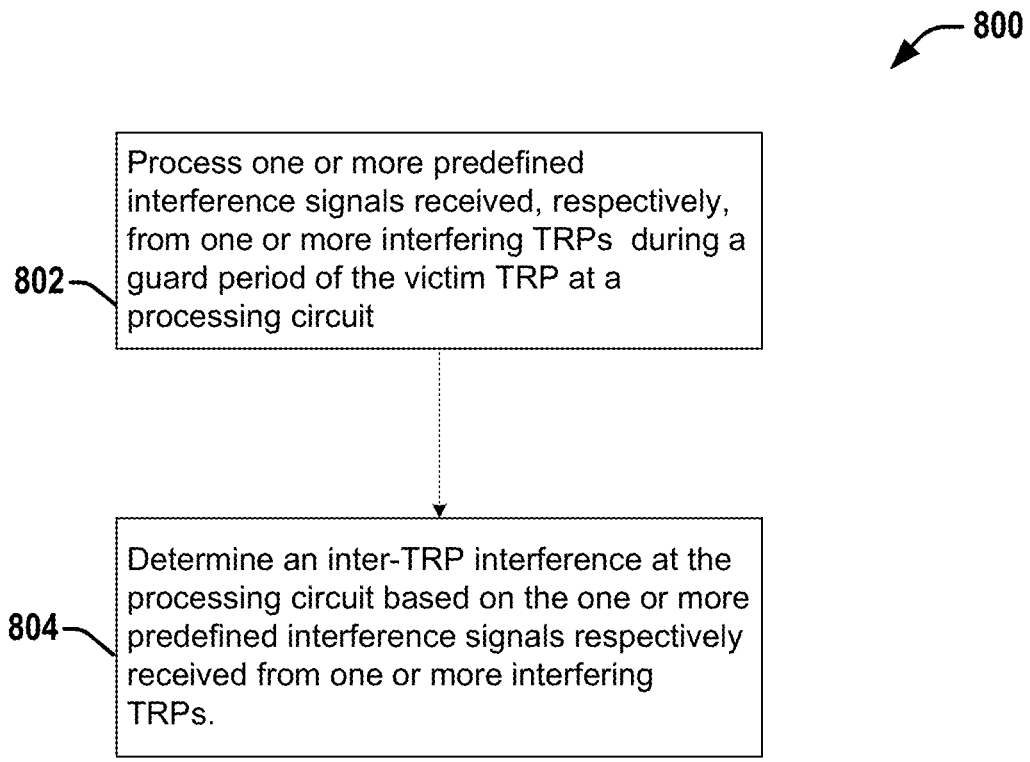
FIG. 8 illustrates a flow chart for a method for a victim transmission reception point (TRP) that determines an inter-TRP interference during a guard period associated with the victim TRP, according to one embodiment of the disclosure.

FIG. 8 illustrates a flow chart of a method 800 for a victim transmission reception point (TRP) that determines an inter-TRP interference during a guard period associated with the victim TRP, according to one embodiment of the disclosure. The method 800 is explained herein with reference to the apparatus 600 in FIG. 6. In some embodiments, the apparatus 600 could be included within the victim TRP 102 in FIG. 1. At 802, one or more predefined interference signals (e.g., the first predefined interference signal 108 and the second predefined interference signal 110) received, respectively, from one or more interfering TRPs (e.g., the first interfering TRP 104 and the second interfering TRP 106) during a guard period of the victim TRP (e.g., the victim TRP 102) is processed at the processing circuit 610. In some embodiments, the one or more predefined interference signals comprises reference signals. In some embodiments, the one or more predefined interference signals comprise channel state information reference signals (CSI-RS).

In some embodiments, the one or more predefined interference signals are received at the processing circuit 610 on one or more interfering signal resources respectively associated with the guard period of the victim TRP. In some embodiments, the one or more interfering signal resources comprises one or more time-frequency resources associated with the guard period of the victim TRP. In some embodiments, the one or more interfering signal resources associated with the guard period to be utilized respectively by the one or more interfering TRPs to send the one or more predefined interference signals is determined at the processing circuit 610. In such embodiments, the processing circuit 610 is configured to generate and provide a configuration signal comprising information on the determined interfering signal resources to the one or more interfering TRPs, in order to configure the one or more interfering TRPs to send the corresponding predefined interference signals on the determined interfering signal resources. At 804, an inter-TRP interference is determined at the processing circuit 610 based on the one or more predefined interference signals respectively received from one or more interfering TRPs. In some embodiments, the inter-TRP interference comprises a measurement of a UL interference at the victim TRP from the one or more interfering TRPs.

Figure 9:
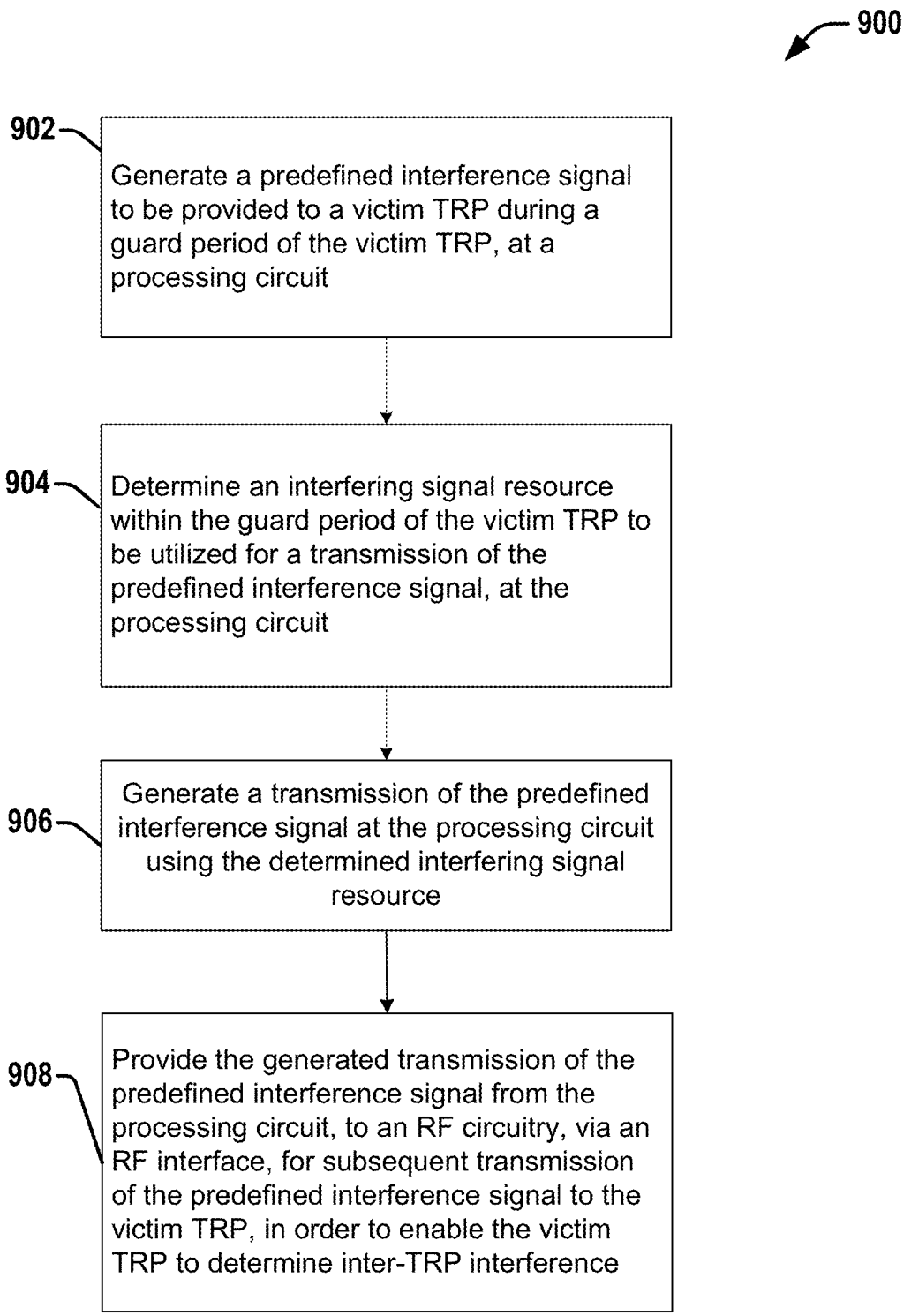
FIG. 9 illustrates a flow chart for a method for an interfering transmission reception point (TRP) that facilitates a victim TRP to determine an inter-TRP interference during a guard period associated with the victim TRP, according to one embodiment of the disclosure.

FIG. 9 illustrates a flow chart for a method 900 for an interfering transmission reception point (TRP) that facilitates a victim TRP to determine an inter-TRP interference during a guard period associated with the victim TRP, according to one embodiment of the disclosure. The method 900 is explained herein with reference to the apparatus 600 in FIG. 6. In some embodiments, the apparatus 600 could be included within the first interfering TRP 104 in FIG. 1 or the second interfering TRP 106 in FIG. 1. In this embodiment, the apparatus 600 is assumed to be included within the first interfering TRP 104 in FIG. 1. At 902, a predefined interference signal (e.g., the first predefined interference signal 108 in FIG. 1), to be provided to a victim TRP (e.g., the victim TRP 102 in FIG. 1) during a guard period of the victim TRP is generated at the processing circuit 610. In some embodiments, the predefined interference signal comprises a reference signal. In some embodiments, the predefined interference signal comprises a channel state information reference signal (CSI-RS). In some embodiments, the predefined interference signal is precoded.

At 904, an interfering signal resource within the guard period of the victim TRP to be utilized for a transmission of the predefined interference signal is determined at the processing circuit 610. In some embodiments, the interfering signal resource comprises one or more resources within the guard period of the victim TRP. In some embodiments, the interfering signal resource within the guard period of the victim TRP to be utilized for the transmission of the predefined interference signal is determined at the processing circuit 610, based on processing a configuration signal comprising information on the interfering signal resource, received from the victim TRP. Alternately, in some embodiments, the interfering signal resource within the guard period of the victim TRP to be utilized for the transmission of the predefined interference signal is determined at the processing circuit 610, based on predefined information stored in the memory circuit 630 of the interfering TRP. Alternately, in some embodiments, the interfering signal resource within the guard period of the victim TRP to be utilized for the transmission of the predefined interference signal is determined at the processing circuit 610 randomly. At 906, a transmission of the predefined interference signal is generated at the processing circuit 610 using the determined interfering signal resource. At 908, the generated transmission of the predefined interference signal is provided by the processing circuit 610, to an RF circuitry, via an RF interface, for subsequent transmission of the predefined interference signal to the victim TRP, in order to enable the victim TRP to determine inter-TRP interference.

Figure 10:
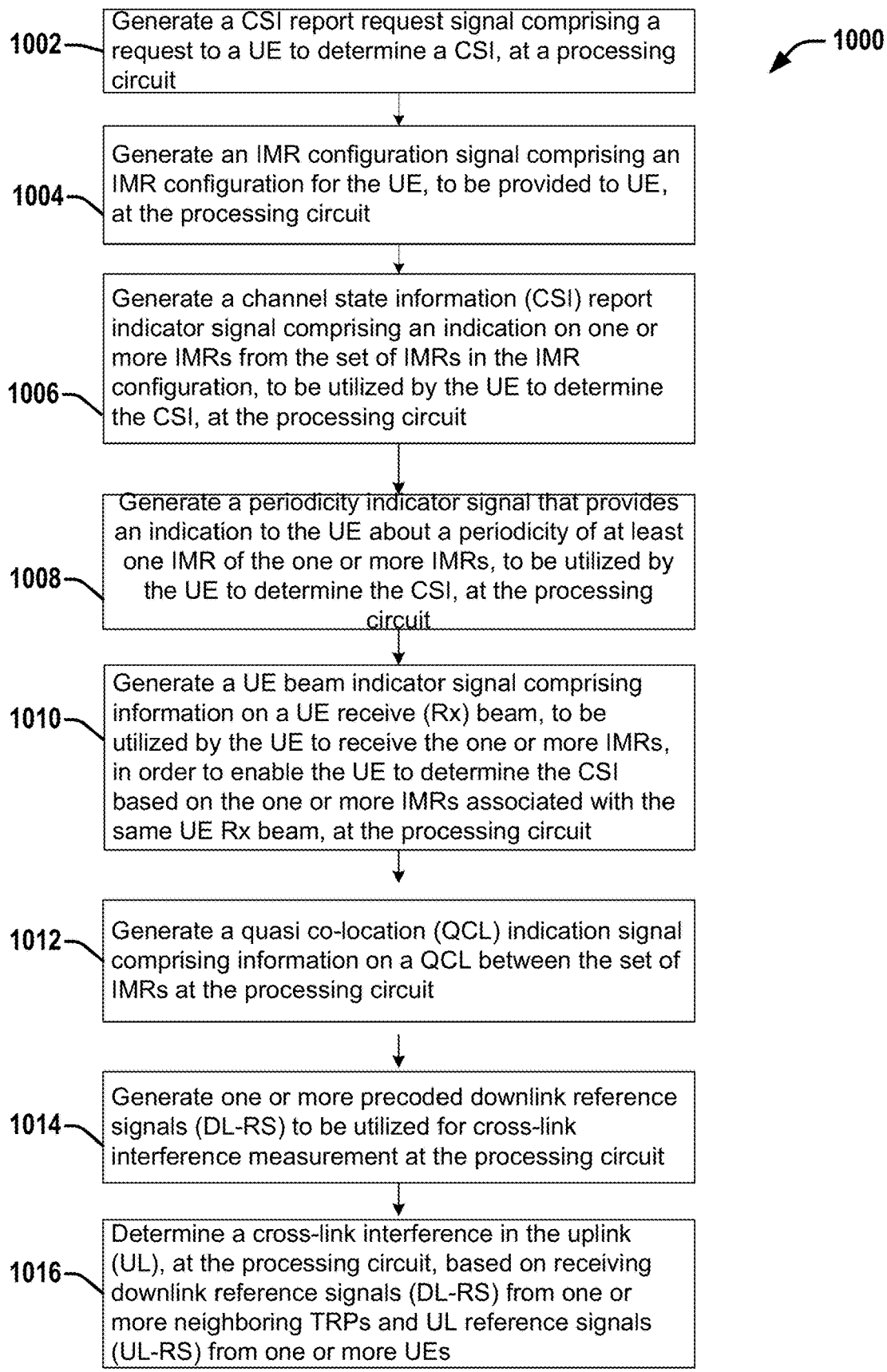
FIG. 10 illustrates a flow chart for a method for a transmission reception point (TRP) that configures one or more interference measurement resources (IMRs) to be utilized by a UE to determine channel state information (CSI) or interference, according to one embodiment of the disclosure.

FIG. 10 illustrates a flow chart for a method 1000 for a transmission reception point (TRP) that configures one or more interference measurement resources (IMRs) to be utilized by a UE to determine channel state information (CSI) or interference, according to one embodiment of the disclosure. The method 1000 is explained herein with reference to the apparatus 600 in FIG. 6. In some embodiments, the apparatus 600 could be included within the TRP 402 in FIG. 4. At 1002, a CSI report request signal (e.g., the CSI report request signal 405 in FIG. 4) comprising a request to a UE (e.g., the UE 404 in FIG. 4) to determine a CSI, is generated at the processing circuit 610. At 1004, an IMR configuration signal (e.g., the IMR configuration signal 406 in FIG. 4) comprising an IMR configuration for the UE, to be provided to UE, is generated at the processing circuit 610. In some embodiments, the IMR configuration comprises a configuration information associated with a set of IMRs configured to be utilized for channel state information (CSI) measurement at the UE. In some embodiments, the set of IMRs in the IMR configuration comprises one or more reference signals associated with the TRP. In some embodiments, the set of IMRs comprises a CSI-RS and a demodulation reference signal (DM-RS).

At 1006, a channel state information (CSI) report indicator signal (e.g., the CSI report indicator signal 408) to be provided to the UE, is generated at the processing circuit 610. In some embodiments, the CSI report indicator signal comprises an indication on one or more IMRs from the set of IMRs in the IMR configuration, to be utilized by the UE to determine the CSI. In some embodiments, when the IMR configuration is based on CSI-RS and DM-RS, the one or more IMRs in the CSI report indicator signal comprises the CSI-RS only or the DM-RS only, or both. At 1008, a periodicity indicator signal (e.g., the periodicity indicator signal 410 in FIG. 4), to be provided to the UE, is generated at the processing circuit 610. In some embodiments, the periodicity indicator signal provides an indication to the UE about a periodicity of at least one IMR of the one or more IMRs, to be utilized by the UE to determine the CSI. At 1010, a UE beam indicator signal (e.g., the UE beam indicator signal 412 in FIG. 4), to be provided to the UE, is generated at the processing circuit 610. In some embodiments, the UE beam indicator signal comprises information on a UE receive (Rx) beam, to be utilized by the UE to receive the one or more IMRs, in order to enable the UE to determine the CSI based on the one or more IMRs associated with the same UE Rx beam.

At 1012, a quasi co-location (QCL) indication signal (e.g., the QCL indication signal 413 in FIG. 4) to be provided to the UE, is generated at the processing circuit 610. In some embodiments, the QCL indication signal comprises information on a QCL between the set of IMRs, for example, the CSI-RS and DM-RS. At 1014, one or more precoded downlink reference signals (DL-RS) to be utilized for cross-link interference measurement is generated at the processing circuit 610, as explained above with respect to FIG. 5a and FIG. 5b. At 1016, a cross-link interference in the uplink (UL) is determined at the processing circuit 610, based on receiving downlink reference signals (DL-RS) from one or more neighboring TRPs and UL reference signals (UL-RS) from one or more UEs, as explained above with respect to FIG. 5a and FIG. 5b.

Figure 11:
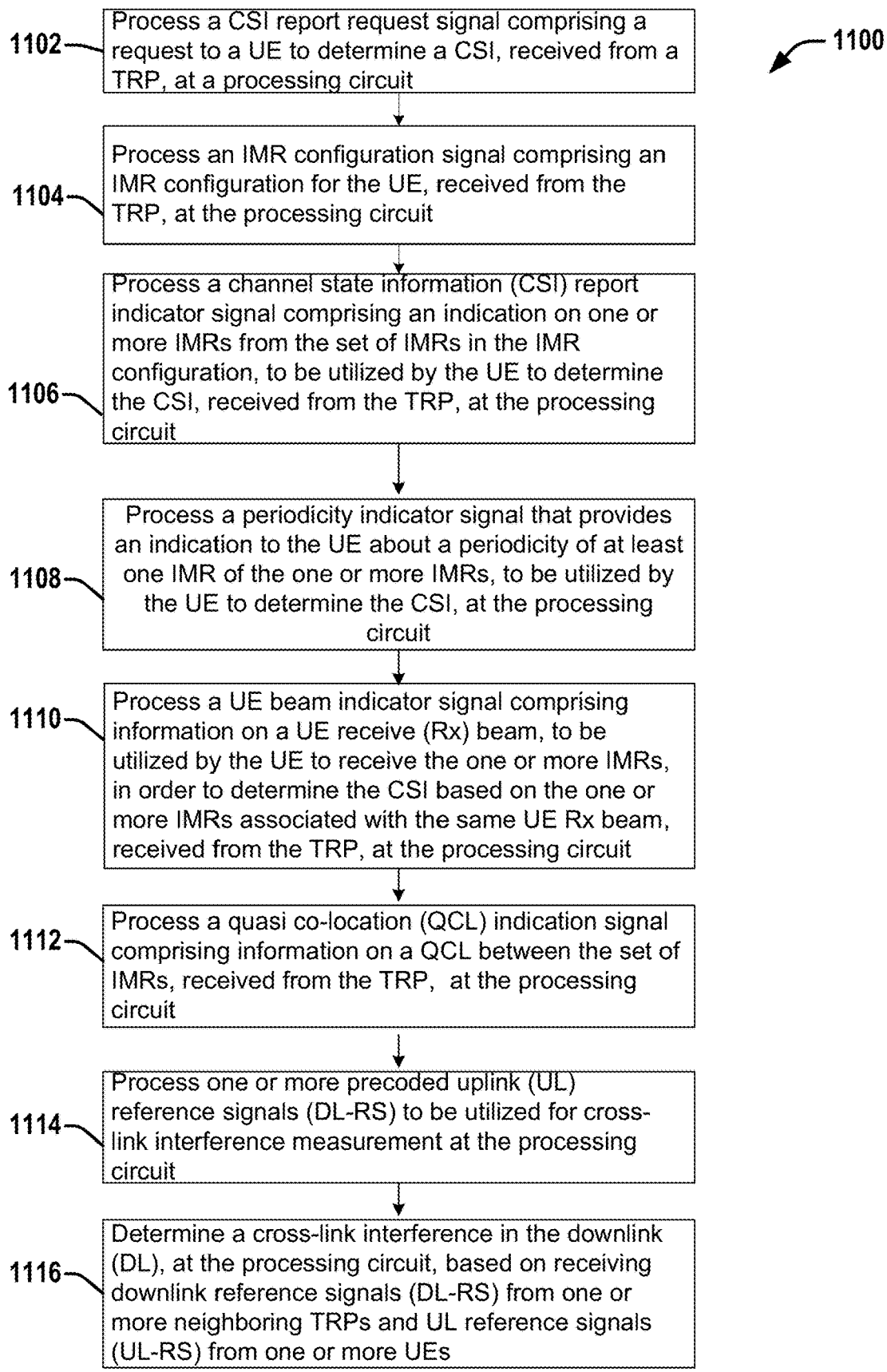
FIG. 11 illustrates a flow chart for a method for a user equipment (UE) configured to determine a channel state information (CSI), according to one embodiment of the disclosure.

FIG. 11 illustrates a flow chart for a method 1100 for a user equipment (UE) configured to determine a channel state information (CSI), according to one embodiment of the disclosure. The method 1100 is explained herein with reference to the apparatus 700 in FIG. 7. In some embodiments, the apparatus 700 could be included within the UE 404 in FIG. 4. At 1102, a CSI report request signal (e.g., the CSI report request signal 405 in FIG. 4) comprising a request to the UE (e.g., the UE 404 in FIG. 4) to determine a CSI, received from a TRP (e.g., the TRP 402 in FIG. 4) is processed at the processing circuit 710. At 1004, an IMR configuration signal (e.g., the IMR configuration signal 406 in FIG. 4) comprising an IMR configuration for the UE, received from the TRP is processed at the processing circuit 710. In some embodiments, the IMR configuration comprises a configuration information associated with a set of IMRs configured to be utilized for channel state information (CSI) measurement at the UE. In some embodiments, the set of IMRs in the IMR configuration comprises one or more reference signals associated with the TRP. In some embodiments, the set of IMRs comprises a CSI-RS and DM-RS.

At 1106, a channel state information (CSI) report indicator signal (e.g., the CSI report indicator signal 408), received from the TRP is processed at the processing circuit 710. In some embodiments, the CSI report indicator signal comprises an indication on one or more IMRs from the set of IMRs in the IMR configuration, to be utilized by the UE to determine the CSI. In some embodiments, the one or more IMRs indicated in the CSI report indicator signal comprises CSI-RS only or DM-RS only, or both. At 1108, a periodicity indicator signal (e.g., the periodicity indicator signal 410 in FIG. 4), received from the TRP is processed at the processing circuit 710. In some embodiments, the periodicity indicator signal provides an indication to the UE about a periodicity of at least one IMR of the one or more IMRs, to be utilized by the UE to determine the CSI. At 1110, a UE beam indicator signal (e.g., the UE beam indicator signal 412 in FIG. 4), received from the TRP is processed at the processing circuit 710. In some embodiments, the UE beam indicator signal comprises information on a UE receive (Rx) beam, to be utilized by the UE to receive the one or more IMRs, in order to enable the UE to determine the CSI based on the one or more IMRs associated with the same UE Rx beam.

At 1112, a quasi co-location (QCL) indication signal (e.g., the QCL indication signal 413 in FIG. 4) received from the TRP is processed at the processing circuit 710. In some embodiments, the QCL indication signal comprises information on a QCL between the set of IMRs, for example, the CSI-RS and DM-RS. At 1114, one or more precoded uplink reference signals (UL-RS) to be utilized for cross-link interference measurement is generated at the processing circuit 710, as explained above with respect to FIG. 5a and FIG. 5b. At 1116, a cross-link interference in the downlink (DL) is determined at the processing circuit 710, based on receiving downlink reference signals (DL-RS) from one or more neighboring TRPs and UL reference signals (UL-RS) from one or more UEs, as explained above with respect to FIG. 5a and FIG. 5b.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Figure 12:
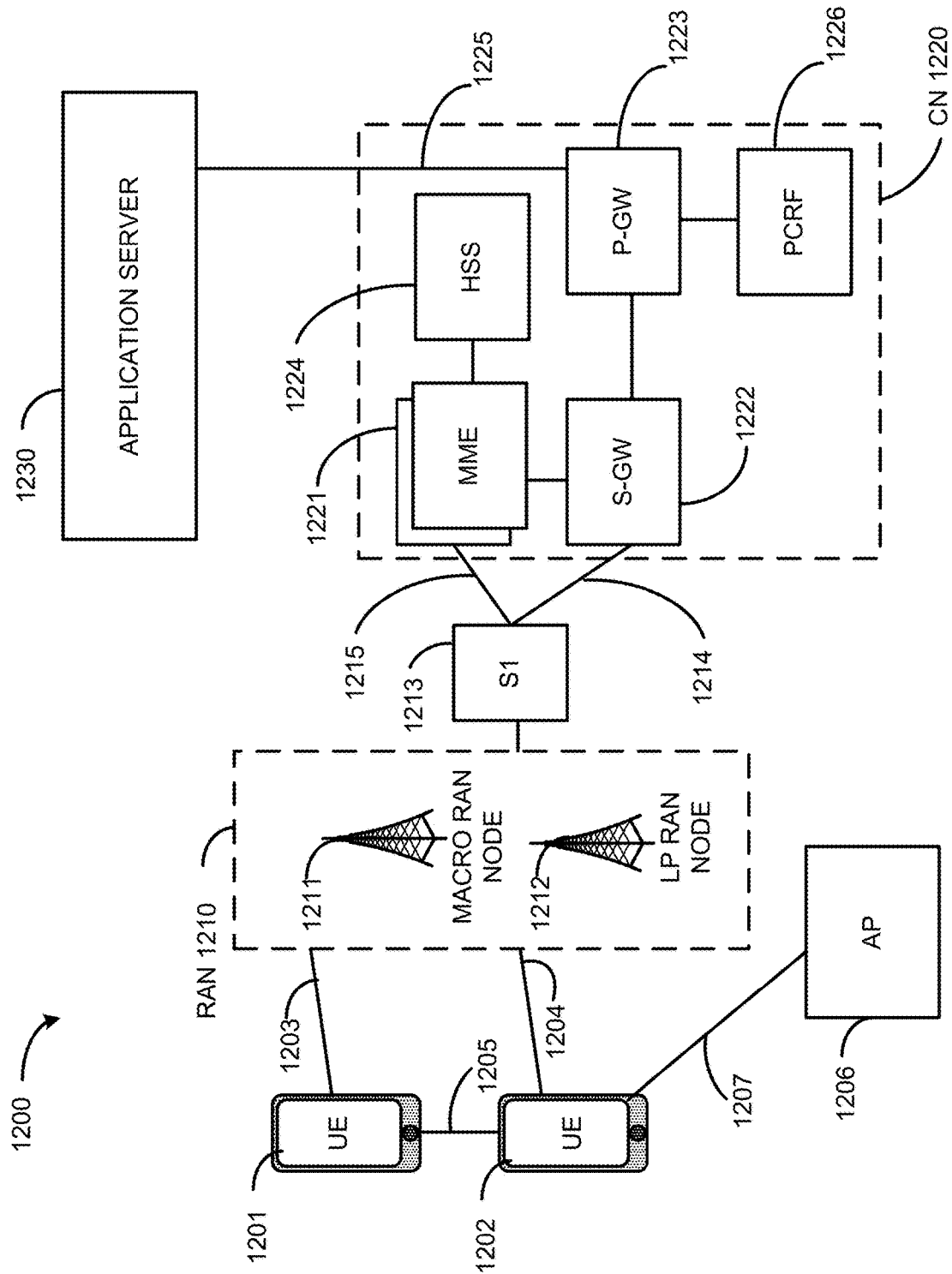
FIG. 12 illustrates an architecture of a system of a network in accordance with some embodiments.

Embodiments described herein can be implemented into a system using any suitably configured hardware and/or software. FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 1201 and 1202 can be configured to connect, e.g., communicatively couple, with a radio access network (RAN) 1210—the RAN 1210 can be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 can further directly exchange communication data via a ProSe interface 1205. The ProSe interface 1205 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 1202.11 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 1210 can include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 1201 and 1202. The physical downlink control channel (PDCCH) can carry information about the transport format and resource allocations related to the PDSCH channel, among other things. It can also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1202 within a cell) can be performed at any of the RAN nodes 1211 and 1212 based on channel quality information fed back from any of the UEs 1201 and 1202. The downlink resource assignment information can be sent on the PDCCH used for (e.g., assigned to) each of the UEs 1201 and 1202.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 12).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 1210 is shown to be communicatively coupled to a core network (CN) 1220—via an S1 interface 1213. In embodiments, the CN 1220 can be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 can be similar in function to the control plane of legacy Serving General Packet Radio Service (GPRS) Support Nodes (SGSN). The MMEs 1221 can manage mobility aspects in access such as gateway selection and tracking area list management. The HSS 1224 can comprise a database for network users, including subscription-related information to support the network entities' handling of communication sessions. The CN 1220 can comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 can terminate the S1 interface 1213 towards the RAN 1210, and routes data packets between the RAN 1210 and the CN 1220. In addition, the S-GW 1222 can be a local mobility anchor point for inter-RAN node handovers and also can provide an anchor for inter-3GPP mobility. Other responsibilities can include lawful intercept, charging, and some policy enforcement.

The P-GW 1223 can terminate an SGi interface toward a PDN. The P-GW 1223 can route data packets between the EPC network 1223 and external networks such as a network including the application server 1230 (alternatively referred to as application function (AF)) via an Internet Protocol (IP) interface 1225. Generally, the application server 1230 can be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 can further be a node for policy enforcement and charging data collection. Policy and Charging Enforcement Function (PCRF) 1226 is the policy and charging control element of the CN 1220. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 can be communicatively coupled to the application server 1230 via the P-GW 1223. The application server 1230 can signal the PCRF 1226 to indicate a new service flow and select the appropriate Quality of Service (QoS) and charging parameters. The PCRF 1226 can provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
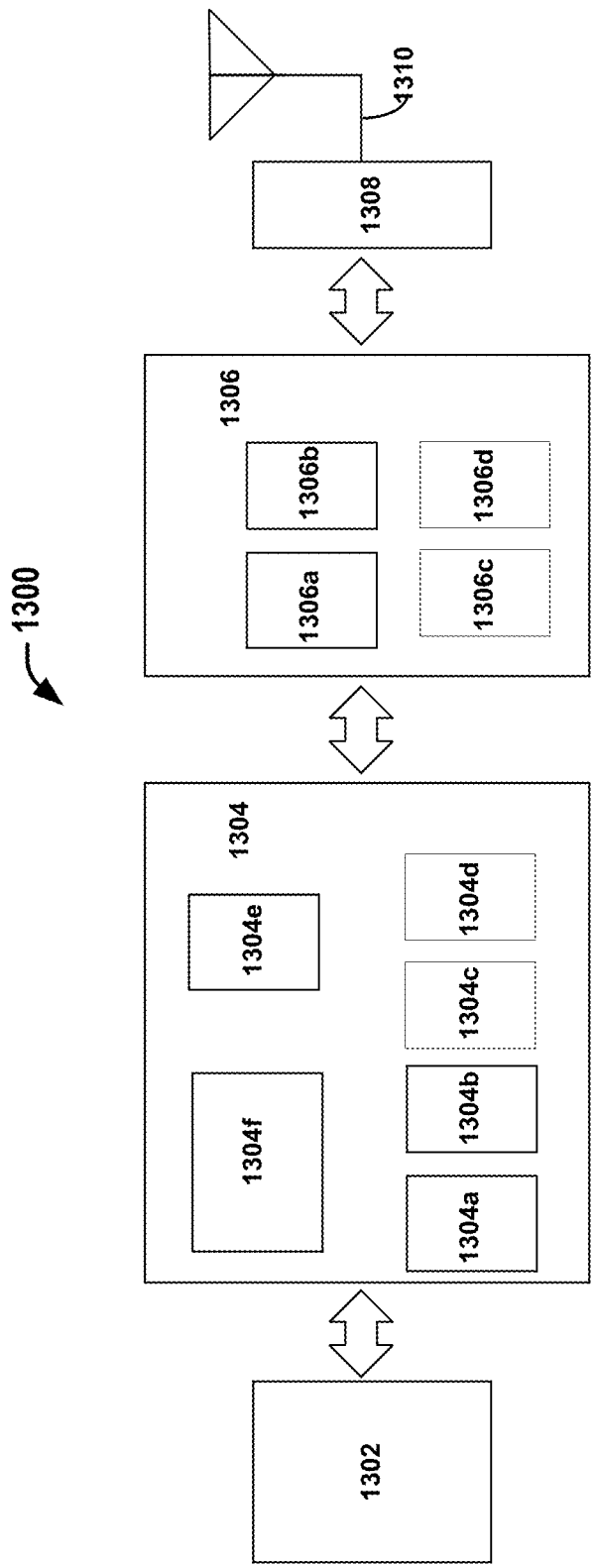
FIG. 13 illustrates example components of a device in accordance with some embodiments.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node (e.g., a TRP or gNodeB). In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), si13h generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
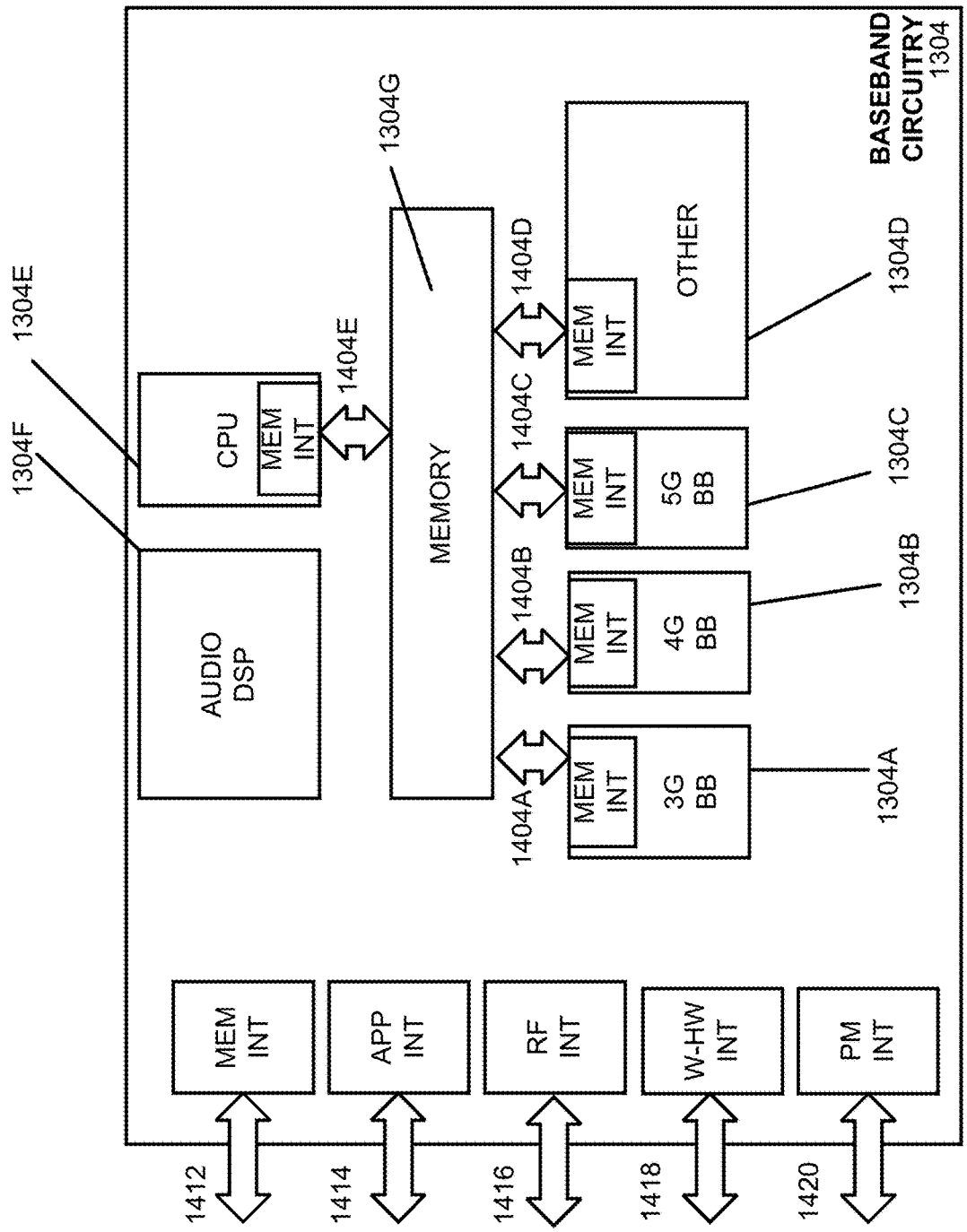
FIG. 14 illustrates example interfaces of baseband circuitry in accordance with some embodiments.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
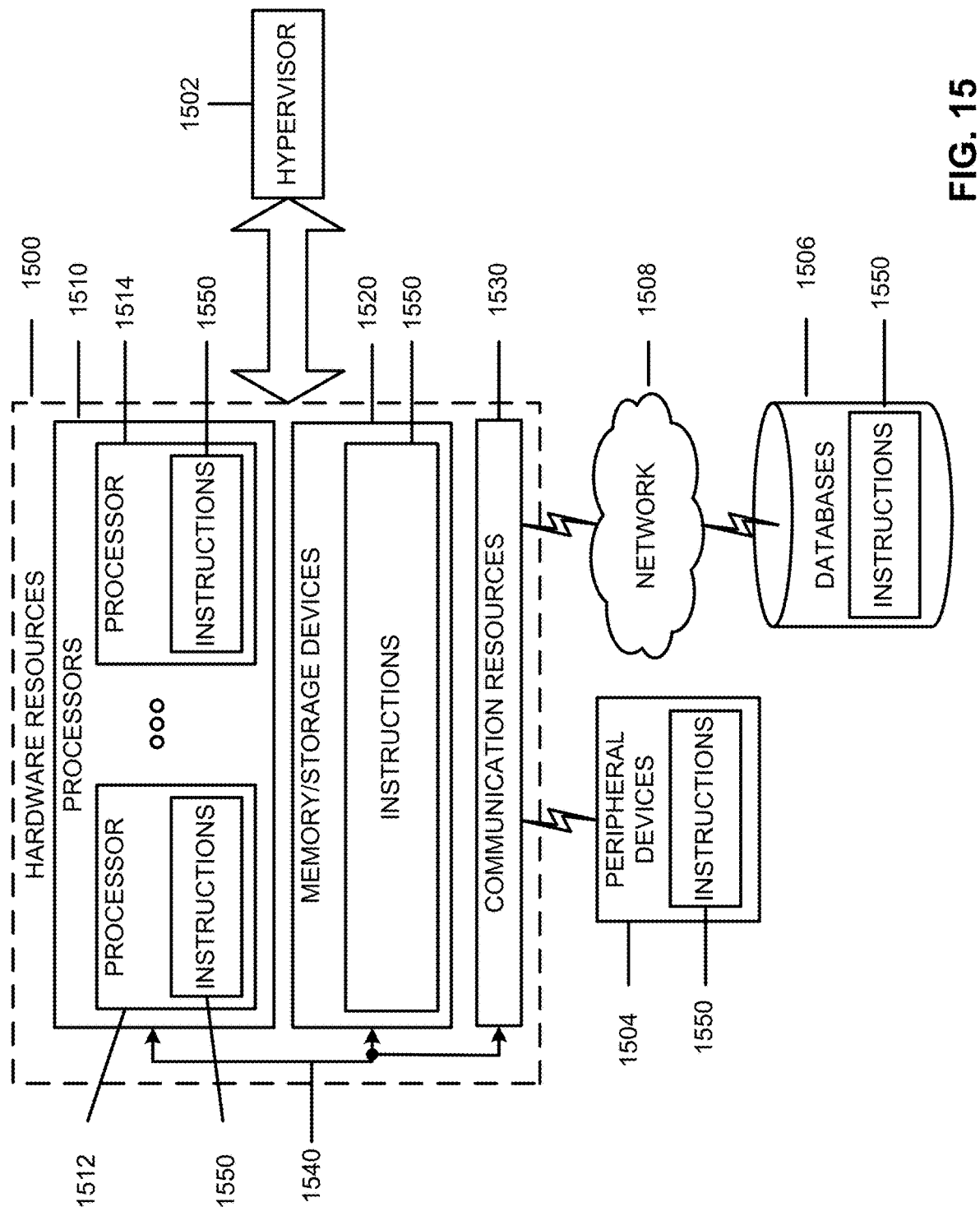
FIG. 15 is a block diagram illustrating components, according to some example embodiments, able to read instructions from a machine-readable or computer-readable medium (e.g., a non-transitory machine-readable storage medium) and perform any one or more of the methodologies discussed herein.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a victim transmission reception point (TRP) associated with a new radio (NR) communication system, comprising a memory interface configured to receive instructions from a memory; and a processing circuit configured, upon execution of instructions received from the memory interface, to process one or more predefined interference signals respectively received from one or more interfering TRPs during a guard period of the victim TRP, wherein the guard period comprises a time period between a downlink (DL) transmission and an uplink (UL) transmission associated with a time division duplex (TDD) frame of the victim TRP; and determine an inter-TRP interference based on the one or more predefined interference signals, wherein the inter-TRP interference comprises a measurement of a UL interference at the victim TRP from the one or more interfering TRPs.

Example 2 is an apparatus, including the subject matter of example 1, wherein the one or more predefined interference signals are received at the processing circuit on one or more interfering signal resources respectively associated with the guard period of the victim TRP, wherein each of the one or more interfering signal resources comprises one or more time-frequency resources associated with the guard period of the victim TRP.

Example 3 is an apparatus, including the subject matter of examples 1-2, including or omitting elements, wherein the one or more predefined interference signals comprises reference signals.

Example 4 is an apparatus, including the subject matter of examples 1-3, including or omitting elements, wherein the one or more predefined interference signals comprise channel state information reference signals (CSI-RS).

Example 5 is an apparatus, including the subject matter of examples 1-4, including or omitting elements, wherein the processing circuit is further configured to determine the one or more interfering signal resources associated with the guard period of the victim TRP, to be utilized respectively by the one or more interfering TRPs, to send the respective predefined interference signals to the victim TRP.

Example 6 is an apparatus, including the subject matter of examples 1-5, including or omitting elements, wherein the processing circuit is further configured to generate a configuration signal comprising information on the determined interfering signal resources associated with the guard period; and provide the configuration signal to the one or more interfering TRPs, in order to configure the one or more interfering TRPs to send the corresponding predefined interference signals on the determined interfering signal resources.

Example 7 is an apparatus, including the subject matter of examples 1-6, including or omitting elements, wherein at least one of the one or more predefined interference signals is pre-coded.

Example 8 is an apparatus configured to be employed in an interfering transmission reception point (TRP) associated with a new radio (NR) communication system, comprising a memory interface configured to receive instructions from a memory; and a processing circuit configured, upon execution of instructions received from the memory interface, to generate a predefined interference signal, to be provided to a victim TRP during a guard period of the victim TRP, in order to enable the victim TRP to determine an inter-TRP interference, wherein the guard period comprises a time period between a downlink (DL) transmission period and an uplink (UL) transmission period associated with a time division duplex (TDD) frame of the victim TRP; determine an interfering signal resource within the guard period of the victim TRP, wherein the interfering signal resource comprises one or more time-frequency resources within the guard period of the victim TRP, to be utilized by the processing circuit, for a transmission of the predefined interference signal; and generate a transmission of the predefined interference signal using the determined interfering signal resource; and a radio frequency (RF) interface configured to provide the generated transmission of the predefined interference signal, to an RF circuitry, for subsequent transmission of the predefined interference signal.

Example 9 is an apparatus, including the subject matter of example 8, wherein the predefined interference signal comprises a reference signal.

Example 10 is an apparatus, including the subject matter of examples 8-9, including or omitting elements, wherein the predefined interference signal comprises a channel state information reference signal (CSI-RS).

Example 11 is an apparatus, including the subject matter of examples 8-10, including or omitting elements, wherein the processing circuit is further configured to precode the predefined interference signal, prior to generating the transmission of the predefined interference signal on the determined interfering signal resource.

Example 12 is an apparatus, including the subject matter of examples 8-11, including or omitting elements, wherein the processing circuit is configured to determine the interfering signal resource within the guard period of the victim TRP to be utilized for the transmission of the predefined interference signal, based on processing a configuration signal comprising information on the interfering signal resource, received from the victim TRP.

Example 13 is an apparatus, including the subject matter of examples 8-12, including or omitting elements, wherein the processing circuit is configured to determine the interfering signal resource within the guard period of the victim TRP to be utilized for the transmission of the predefined interference signal, based on predefined information stored in a memory circuit of the interfering TRP.

Example 14 is an apparatus configured to be employed in a transmission reception point (TRP) associated with a new radio (NR) system, comprising a memory interface configured to receive instructions from a memory; and a processing circuit configured, upon execution of instructions received from the memory interface, to determine an interference measurement resource (IMR) configuration for a user equipment (UE), wherein the IMR configuration comprises a configuration information associated with a set of IMRs configured to be utilized for channel state information (CSI) measurement at the UE; and generate an IMR configuration signal comprising the determined IMR configuration, to be provided to UE, in order to provide information on the determined IMR configuration to the UE; and a radio frequency (RF) interface configured to provide the IMR configuration signal, to an RF circuitry, for subsequent transmission of the IMR configuration signal to the UE.

Example 15 is an apparatus, including the subject matter of example 14, wherein the processing circuit is further configured to generate a channel state information (CSI) report indicator signal, to be provided to the UE, wherein the CSI report indicator signal comprises an indication on one or more IMRs from the set of IMRs in the IMR configuration, to be utilized by the UE to determine the CSI.

Example 16 is an apparatus, including the subject matter of examples 14-15, including or omitting elements, wherein the set of IMRs in the IMR configuration comprises one or more reference signals associated with the TRP.

Example 17 is an apparatus, including the subject matter of examples 14-16, including or omitting elements, wherein the set of IMRs in the IMR configuration comprises a channel state information reference signal (CSI-RS) or a demodulation reference signal (DM-RS), or both.

Example 18 is an apparatus, including the subject matter of examples 14-17, including or omitting elements, wherein, when the set of IMRs in the IMR configuration comprises the CSI-RS and the DM-RS, the one or more IMRs indicated in the CSI report indicator signal comprises the CSI-RS or the DM-RS, or both.

Example 19 is an apparatus, including the subject matter of examples 14-18, including or omitting elements, wherein the processing circuit is configured to determine the IMR configuration based on a measurement restriction configured for the UE.

Example 20 is an apparatus, including the subject matter of examples 14-19, including or omitting elements, wherein the processing circuit is configured to provide the IMR configuration signal or CSI report indicator signal, or both, to the UE via radio resource control (RRC) signaling or digital control information (DCI).

Example 21 is an apparatus, including the subject matter of examples 14-20, including or omitting elements, wherein the processing circuit is further configured to generate a periodicity indicator signal, to be provided to the UE, wherein the periodicity indicator signal provides an indication to the UE about a periodicity of at least one IMR of the one or more IMRs indicated in the CSI report indicator signal, to be utilized by the UE to determine the CSI.

Example 22 is an apparatus, including the subject matter of examples 14-21, including or omitting elements, wherein the processing circuit is further configured to generate a UE beam indicator signal, to be provided to the UE, wherein the UE beam indicator signal comprises information on a UE receive (Rx) beam, to be utilized by the UE to receive the one or more IMRs indicated in the CSI report indicator signal, in order to enable the UE to determine the CSI based on the one or more IMRs associated with the same UE Rx beam.

Example 23 is an apparatus, including the subject matter of examples 14-22, including or omitting elements, wherein the processing circuit is further configured to generate one or more precoded downlink reference signals (DL-RS) to be utilized for cross-link interference measurement.

Example 24 is an apparatus, including the subject matter of examples 14-23, including or omitting elements, wherein the processing circuit is further configured to measure cross-link interference in the uplink (UL), based on receiving downlink reference signals (DL-RS) from one or more neighboring TRPs and UL reference signals (UL-RS) from one or more UEs.

Example 25 is an apparatus configured to be employed in a user equipment (UE) associated with a new radio (NR) system, comprising a memory interface configured to receive instructions from a memory; and a processing circuit configured, upon execution of instructions received from the memory interface, to process an interference measurement resource (IMR) configuration signal comprising an IMR configuration for the UE, received from a TRP, wherein IMR configuration comprises a configuration information associated with a set of IMRs configured to be utilized for channel state information (CSI) measurement at the UE; and determine the channel state information (CSI), at least partly, based on the information in the IMR configuration signal.

Example 26 is an apparatus, including the subject matter of example 25, wherein the processing circuit is further configured to process a channel state information (CSI) report indicator signal, received from the TRP, wherein the CSI report indicator signal comprises an indication on one or more IMRs from the set of IMRs in the IMR configuration, to be utilized by the UE to determine the CSI.

Example 27 is an apparatus, including the subject matter of examples 25-26, including or omitting elements, wherein the set of IMRs in the IMR configuration comprises one or more reference signals associated with the TRP.

Example 28 is an apparatus, including the subject matter of examples 25-27, including or omitting elements, wherein the set of IMRs in the IMR configuration comprises a channel state information reference signal (CSI-RS) or a demodulation reference signal (DM-RS), or both.

Example 29 is an apparatus, including the subject matter of examples 25-28, including or omitting elements, wherein, when the set of IMRs in the IMR configuration comprises the CSI-RS and the DM-RS, the one or more IMRs indicated in the CSI report indicator signal comprises the CSI-RS or the DM-RS, or both.

Example 30 is an apparatus, including the subject matter of examples 25-29, including or omitting elements, wherein the processing circuit is further configured to process a UE beam indicator signal, received from the TRP, prior to determining the CSI, wherein the UE beam indicator signal comprises information on a UE receive (Rx) beam associated with the one or more IMRs indicated in the CSI report indicator signal, to be utilized by the UE, in order to determine the CSI.

Example 31 is an apparatus, including the subject matter of examples 25-30, including or omitting elements, wherein the processing circuit is further configured to process a periodicity indicator signal, received from the TRP, wherein the periodicity indicator signal comprises an indication about a periodicity of at least one IMR of the one or more IMRs indicated in the CSI report indicator signal, to be utilized by the UE to determine the CSI.

Example 32 is an apparatus, including the subject matter of examples 25-31, including or omitting elements, wherein the processing circuit is further configured to generate one or more precoded uplink reference signals (UL-RS) to be utilized for cross-link interference measurement.

Example 33 is an apparatus, including the subject matter of examples 25-32, including or omitting elements, wherein the processing circuit is further configured to measure cross-link interference in the downlink (DL), based on receiving downlink reference signals (DL-RS) from one or more neighboring TRPs and UL reference signals (UL-RS) from one or more neighboring UEs, in order to determine the CSI.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a transmission reception point (TRP) associated with a new radio (NR) system, comprising:
   a processing circuit configured to:
   determine an interference measurement resource (IMR) configuration for a user equipment (UE), wherein the IMR configuration comprises a configuration information associated with a set of IMRs configured to be utilized for determining channel state information (CSI) at the UE;
   generate an IMR configuration signal comprising the determined IMR configuration, to be provided to the UE, in order to provide information on the determined IMR configuration to the UE;
   provide the IMR configuration signal, to an RF circuitry, for subsequent transmission of the IMR configuration signal to the UE, wherein the IMR configuration signal is provided to the UE via radio resource control (RRC) signaling; and
   provide, to the UE, an indication about a periodicity of at least one IMR of the set of IMRs to be utilized by the UE to determine the CSI, wherein the indication about the periodicity of the at least one IMR comprises an information whether the at least one IMR is periodic, aperiodic or semi-persistent.

2. The apparatus of claim 1, wherein the processing circuit is further configured to generate a channel state information (CSI) report indicator signal, to be provided to the UE, wherein the CSI report indicator signal comprises an indication on one or more IMRs from the set of IMRs in the IMR configuration, to be utilized by the UE to determine the CSI.

3. The apparatus of claim 2, wherein, when the set of IMRs in the IMR configuration comprises a channel state information reference signal (CSI-RS) and a demodulation reference signal (DM-RS), the one or more IMRs indicated in the CSI report indicator signal comprises the CSI-RS or the DM-RS, or both.

4. The apparatus of claim 2, wherein the processing circuit is configured to provide the CSI report indicator signal to the UE via the RRC signaling or downlink control information (DCI).

5. The apparatus of claim 1, wherein the set of IMRs in the IMR configuration comprises one or more reference signals associated with the TRP.

6. The apparatus of claim 1, wherein the set of IMRs in the IMR configuration comprises a channel state information reference signal (CSI-RS) or a demodulation reference signal (DM-RS), or both.

7. The apparatus of claim 1, wherein the processing circuit is configured to determine the IMR configuration based on a measurement restriction configured for the UE.

8. The apparatus of claim 1, wherein the processing circuit is further configured to generate a UE beam indicator signal, to be provided to the UE, wherein the UE beam indicator signal comprises information on a UE receive (Rx) beam, to be utilized by the UE to receive the set of IMRs, in order to enable the UE to determine the CSI based on the set of IMRs associated with the UE Rx beam.

9. The apparatus of claim 1, wherein the processing circuit is further configured to generate one or more precoded downlink reference signals (DL-RS) to be utilized for cross-link interference measurement.

10. The apparatus of claim 1, wherein the processing circuit is further configured to measure cross-link interference in uplink (UL), based on receiving downlink reference signals (DL-RS) from one or more neighboring TRPs and UL reference signals (UL-RS) from one or more UEs.

11. The apparatus of claim 1, wherein the indication about the periodicity of the at least one IMR comprises a 1-bit indicator.

12. The apparatus of claim 1, wherein the processing circuit is further configured to generate a quasi co-location (QCL) indication signal, to be provided to the UE, wherein the QCL indication signal comprises information on a QCL between the set of IMRs to be utilized to determine the CSI.

13. An apparatus configured to be employed in a user equipment (UE) associated with a new radio (NR) system, comprising:
   a processing circuit configured to:
   process an interference measurement resource (IMR) configuration signal comprising an IMR configuration for the UE, received from a TRP, wherein IMR configuration comprises a configuration information associated with a set of IMRs configured to be utilized for determining a channel state information (CSI) at the UE and wherein the IMR configuration signal is received from the TRP via radio resource control (RRC) signaling;
   determine the channel state information (CSI), at least partly, based on the configuration information in the IMR configuration signal; and
   receive, from the TRP, an indication about a periodicity of at least one IMR of the set of IMRs, to be utilized by the UE to determine the CSI, wherein the indication about the periodicity of the at least one IMR comprises an information whether the at least one IMR is periodic, aperiodic or semi-persistent.

14. The apparatus of claim 13, wherein the processing circuit is further configured to process a channel state information (CSI) report indicator signal, received from the TRP, wherein the CSI report indicator signal comprises an indication on one or more IMRs from the set of IMRs in the IMR configuration, to be utilized by the UE to determine the CSI.

15. The apparatus of claim 14, wherein, when the set of IMRs in the IMR configuration comprises a channel state information reference signal (CSI-RS) and a demodulation reference signal (DM-RS), the one or more IMRs indicated in the CSI report indicator signal comprises the CSI-RS or the DM-RS, or both.

16. The apparatus of claim 13, wherein the set of IMRs in the IMR configuration comprises one or more reference signals associated with the TRP.

17. The apparatus of claim 13, wherein the set of IMRs in the IMR configuration comprises a channel state information reference signal (CSI-RS) or a demodulation reference signal (DM-RS), or both.

18. The apparatus of claim 13, wherein the processing circuit is further configured to process a UE beam indicator signal, received from the TRP, prior to determining the CSI, wherein the UE beam indicator signal comprises information on a UE receive (Rx) beam associated with the set of IMRs, to be utilized by the UE, in order to determine the CSI.

19. The apparatus of claim 13, wherein the processing circuit is further configured to generate one or more precoded uplink reference signals (UL-RS) to be utilized for cross-link interference measurement.

20. The apparatus of claim 13, wherein the processing circuit is further configured to measure cross-link interference in downlink (DL), based on receiving downlink reference signals (DL-RS) from one or more neighboring TRPs and UL reference signals (UL-RS) from one or more neighboring UEs, in order to determine the CSI.

21. The apparatus of claim 13, wherein the indication about the periodicity of the at least one IMR comprises a 1-bit indicator.

22. The apparatus of claim 13, wherein the processing circuit is further configured to process a quasi co-location (QCL) indication signal, received from the TRP, wherein the QCL indication signal comprises information on a QCL between the set of IMRs to be utilized to determine the CSI.

23. The apparatus of claim 13, wherein the processing circuit is further configured to:
report the CSI via a CSI report signal; and
provide an IMR indicator signal comprising information on IMR utilized to determine the CSI comprised in the CSI report signal.

\* \* \* \* \*